United States Patent
Robbins et al.

(10) Patent No.: US 12,552,110 B2
(45) Date of Patent: Feb. 17, 2026

(54) METHODS FOR FABRICATION OF LAYUPS FOR COMPOSITE HONEYCOMB CORE SANDWICH STRUCTURES AND SAID COMPOSITE HONEYCOMB CORE SANDWICH STRUCTURES

(71) Applicant: The Boeing Company, Arlington, VA (US)

(72) Inventors: Kevin L. Robbins, Winnipeg (CA); Marc G. Storozuk, West St. Paul (CA)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/747,584

(22) Filed: Jun. 19, 2024

(65) Prior Publication Data

US 2025/0387984 A1 Dec. 25, 2025

(51) Int. Cl.
*B29C 70/02* (2006.01)
*B29C 70/38* (2006.01)
*B29C 70/44* (2006.01)
*B29K 105/08* (2006.01)

(52) U.S. Cl.
CPC .......... *B29C 70/023* (2013.01); *B29C 70/382* (2013.01); *B29C 70/44* (2013.01); *B29K 2105/089* (2013.01)

(58) Field of Classification Search
CPC ..... B29C 70/023; B29C 70/382; B29C 70/44; B29K 2105/089
See application file for complete search history.

(56) References Cited

U.S. PATENT DOCUMENTS

| | | |
|---|---|---|
| 5,895,699 A | 4/1999 | Corbett et al. |
| 6,180,206 B1 | 1/2001 | Kain |
| 2009/0283635 A1 | 11/2009 | Gerken et al. |
| 2011/0281114 A1 | 11/2011 | Butler |

OTHER PUBLICATIONS

European Patent Office, Extended European Search Report, App. No. 25182387.8 (Oct. 27, 2025).

*Primary Examiner* — Sonya M Sengupta
(74) *Attorney, Agent, or Firm* — Walters & Wasylyna LLC

(57) ABSTRACT

A method for fabrication of a layup for a composite honeycomb core sandwich structure includes laying up a first plurality of unidirectional tows over a tool for layup of the composite honeycomb core sandwich structure using an automated fiber placement process to form a stack of under-core composite plies that are tied down to a rough textured surface bonded to the tool; placing a honeycomb core on the stack of under-core composite plies within the rough textured surface; and laying up a second plurality of unidirectional tows over the honeycomb core using the automated fiber placement process to form a stack of over-core composite plies that tie down the honeycomb core to the rough textured surface. The method may also include placing an under-core film adhesive on the stack of under-core composite plies and placing an over-core film adhesive on the honeycomb core.

20 Claims, 35 Drawing Sheets

METHODS FOR FABRICATION OF LAYUPS FOR COMPOSITE HONEYCOMB CORE SANDWICH STRUCTURES AND SAID COMPOSITE HONEYCOMB CORE SANDWICH STRUCTURES

FIELD

The present disclosure relates generally to fabrication of layups for composite honeycomb core sandwich structures and, particularly, to laying up unidirectional tows to form a stack of composite plies under the honeycomb core and another stack over the honeycomb core. The unidirectional tows are laid up using an automated fiber placement process. The unidirectional tows tie down the honeycomb core to prevent movement and/or crush during autoclave cure.

BACKGROUND

Composite sandwich structure fabricated using honeycomb core presents significant processing challenges. One of those challenges arises during the curing of the structure, when the pressure from the autoclave (e.g., typically between 30 psig and 45 psig) squeezes the structure down to the tool. Chamfered core edges around the periphery of the core can be particularly susceptible to movement from the lateral pressures applied. In the worst cases the core can entirely crush. Core movement and/or crush both lead to significant rework or scrap of the composite sandwich structure. Existing methods to prevent core movement/crush are applicable to structures fabricated with woven fabric material. This method is known as the tie down method, and it requires that certain plies of the composite structure extend beyond the typical manufacturing excess of the structure to contact a rough textured surface known as grit strip. This rough textured surface allows the woven fabric plies to be tied down in place, which prevents them from moving. The honeycomb core typically "beds in" to the uncured woven fabric and resists movement if the woven fabric is held in place by being tied down. These woven fabrics are typically bidirectional material, with warp fibers running along the main axis of the material and fill fibers running perpendicular to the warp fibers. Only the plies laid up immediately before and after the core require contact with the grit strip for preventing core movement to be successful. Generally, the ply before the core covers half the grit strip, and the ply above the core covers the full grit strip. However, this method will not work for unidirectional tape as fibers only run in a single direction for each ply.

Accordingly, those skilled in the art continue with research and development efforts to introduce new techniques for laying up composite sandwich structures using unidirectional tape.

SUMMARY

Disclosed are examples of disclosed methods for fabrication of layups for composite honeycomb core sandwich structures and said composite honeycomb core sandwich structures. The following is a non-exhaustive list of examples, which may or may not be claimed, of the subject matter according to the present disclosure.

In an example, the disclosed method for fabrication of a layup for a composite honeycomb core sandwich structure includes: (1) laying up a first plurality of unidirectional tows over a tool for layup of the composite honeycomb core sandwich structure using an automated fiber placement process to form a stack of under-core composite plies that are tied down to a rough textured surface bonded to the tool; (2) placing a honeycomb core on the stack of under-core composite plies within the rough textured surface; and (3) laying up a second plurality of unidirectional tows over the honeycomb core using the automated fiber placement process to form a stack of over-core composite plies that tie down the honeycomb core to the rough textured surface.

In an example, the disclosed composite honeycomb core sandwich structure includes a stack of under-core composite plies, a honeycomb core and a stack of over-core composite plies. The stack of under-core composite plies were laid up over a tool using an automated fiber placement process to lay up a first plurality of unidirectional tows. The honeycomb core was placed on the stack of under-core composite plies. The stack of over-core composite plies were laid up over the honeycomb core using the automated fiber placement process to lay up a second plurality of unidirectional tows.

In another example, the disclosed method for fabrication of a layup for a composite honeycomb core sandwich structure includes: (1) laying up a first plurality of unidirectional tows over a tool for layup of the composite honeycomb core sandwich structure using an automated fiber placement process to form a stack of under-core composite plies that are tied down to a rough textured surface bonded to the tool; (2) placing an under-core film adhesive on the stack of under-core composite plies within a trimline for the composite honeycomb core sandwich structure; (3) placing a honeycomb core on the under-core film adhesive within the trimline; (4) placing an over-core film adhesive on the honeycomb core within the trimline; and (5) laying up a second plurality of unidirectional tows over the over-core film adhesive and the rough textured surface using the automated fiber placement process to form a stack of over-core composite plies that tie down the honeycomb core to the rough textured surface.

Other examples of the disclosed methods for fabrication of layups for composite honeycomb core sandwich structures and said composite honeycomb core sandwich structures will become apparent from the following detailed description, the accompanying drawings and the appended claims.

BRIEF DESCRIPTION OF THE DRAWINGS

FIGS. 29A-B 15 is a flow diagram of an example of the laying up the second plurality of unidirectional tows of FIG. 24;

DETAILED DESCRIPTION

Figure 1:
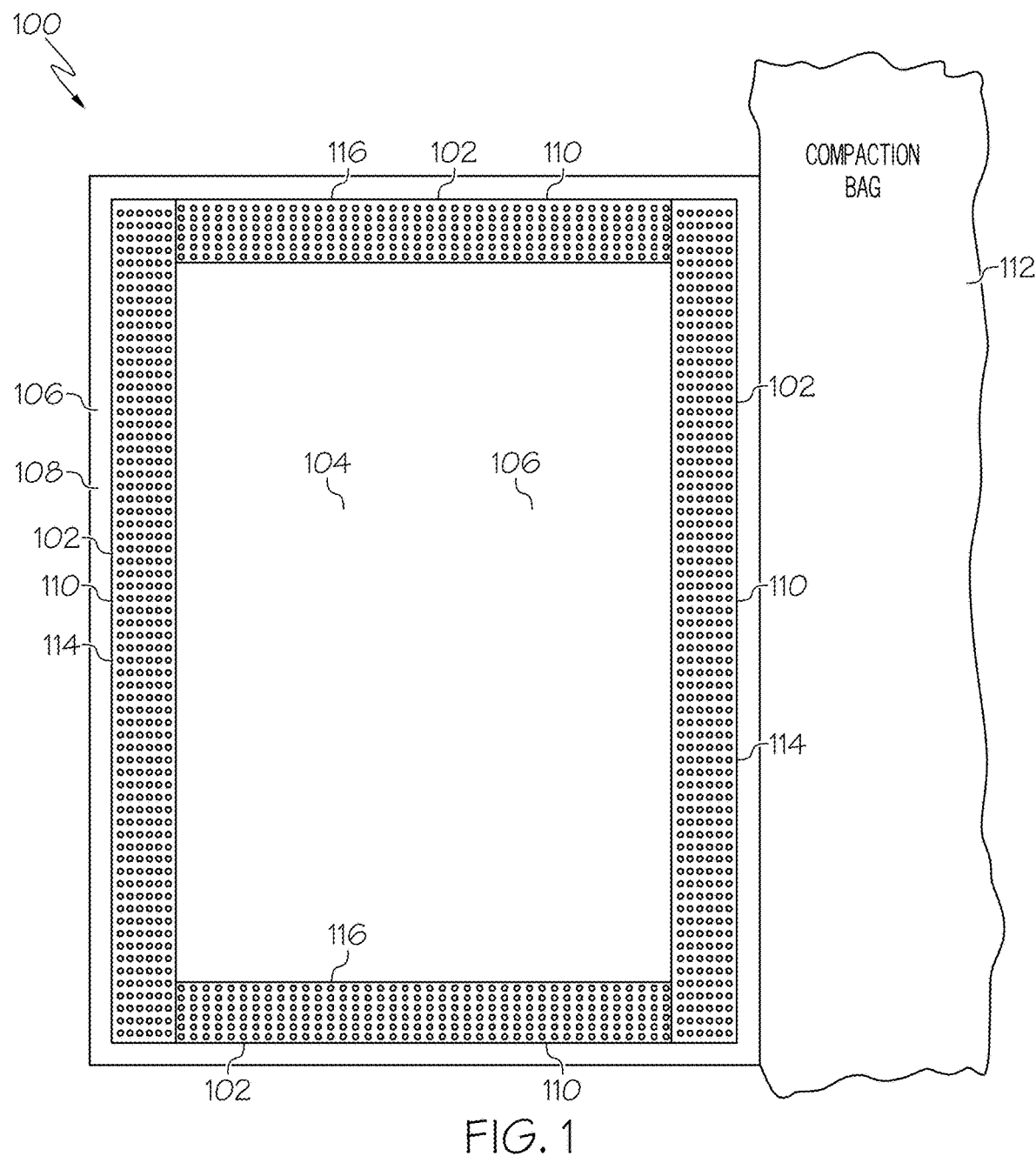
FIG. 1 is a top view of an example of a tool for layup of a composite honeycomb core sandwich structure.

Various examples of methods 500, 1100, 1800, 1900, 2000, 2400, 2500, 3000, 3100, 3400 for fabrication of layups 600 for composite honeycomb core sandwich structures 2100 and said composite honeycomb core sandwich structures 2100 are disclosed herein. The disclosed methods 500, 1100, 1800, 1900, 2000, 2400, 2500, 3000, 3100, 3400 describe a design philosophy to enable the use of tie downs in processing composite honeycomb core sandwich structures 2100 via automated fiber placement equipment. The methods 500, 1100, 1800, 1900, 2000, 2400, 2500, 3000, 3100, 3400 describe an arrangement of plies of a composite unidirectional tape 402, including orientations, to tie down the honeycomb core 606 to prevent movement and/or crush using grit strip 110, which is a rough textured surface 102 added to a layup mandrel (e.g., tool 100) to provide a high degree of friction to the material. This enables the manufacture of complex honeycomb core sandwich structures 2100, such as nacelle components, via automated fiber placement equipment. In other words, the disclosed methods 500, 1100, 1800, 1900, 2000, 2400, 2500, 3000, 3100, 3400 allow for the protection of the honeycomb core 606 from moving and/or crushing during autoclave cure while using composite unidirectional tape 402 for complex honeycomb core sandwich structures 2100.

A demonstration method described in the next few paragraphs was developed and subsequently trialed on a demonstration test article fabricated in late October 2023. The demonstration article was based on the 737MAX nose gear door, a complex honeycomb core structure that normally used the tie down method with carbon fiber woven fabric material in a manual hand layup process. The demonstration method was developed to prevent core movement during the fabrication of the demonstration article in which the honeycomb core was tied town using composite unidirectional tape 402. Since composite unidirectional tape 402 only has fibers running in a single direction, a solution required the creation of a dual ply method, where the orientation of the two plies was perpendicular to the other. The plies below the core may be referred to as tool-side composite plies or under-core composite plies 604, and the plies above the core may be referred to as bag-side plies or over-core composite plies 610.

An analysis was conducted to determine which of the two orientations of tie down plies would be the primary tie down, and which would be the secondary tie down. In the case of the demonstration article, the honeycomb core 606 was a long rectangle with long sides being chamfered at 30 degrees and short sides being chamfered at 20 degrees. The steeper chamfer angle (i.e., 30 degrees) poses the greater risk for core movement, so the ply that runs perpendicular to that chamfer was the ply laid up immediately before and immediately after the honeycomb core 606. The secondary tie down ply was further away from the honeycomb core 606 in either direction. The other tool-side plies were terminated at the beginning of the grit strip 110 and the bag-side plies were terminated at the outer edge of the grit strip 110.

Figure 2:
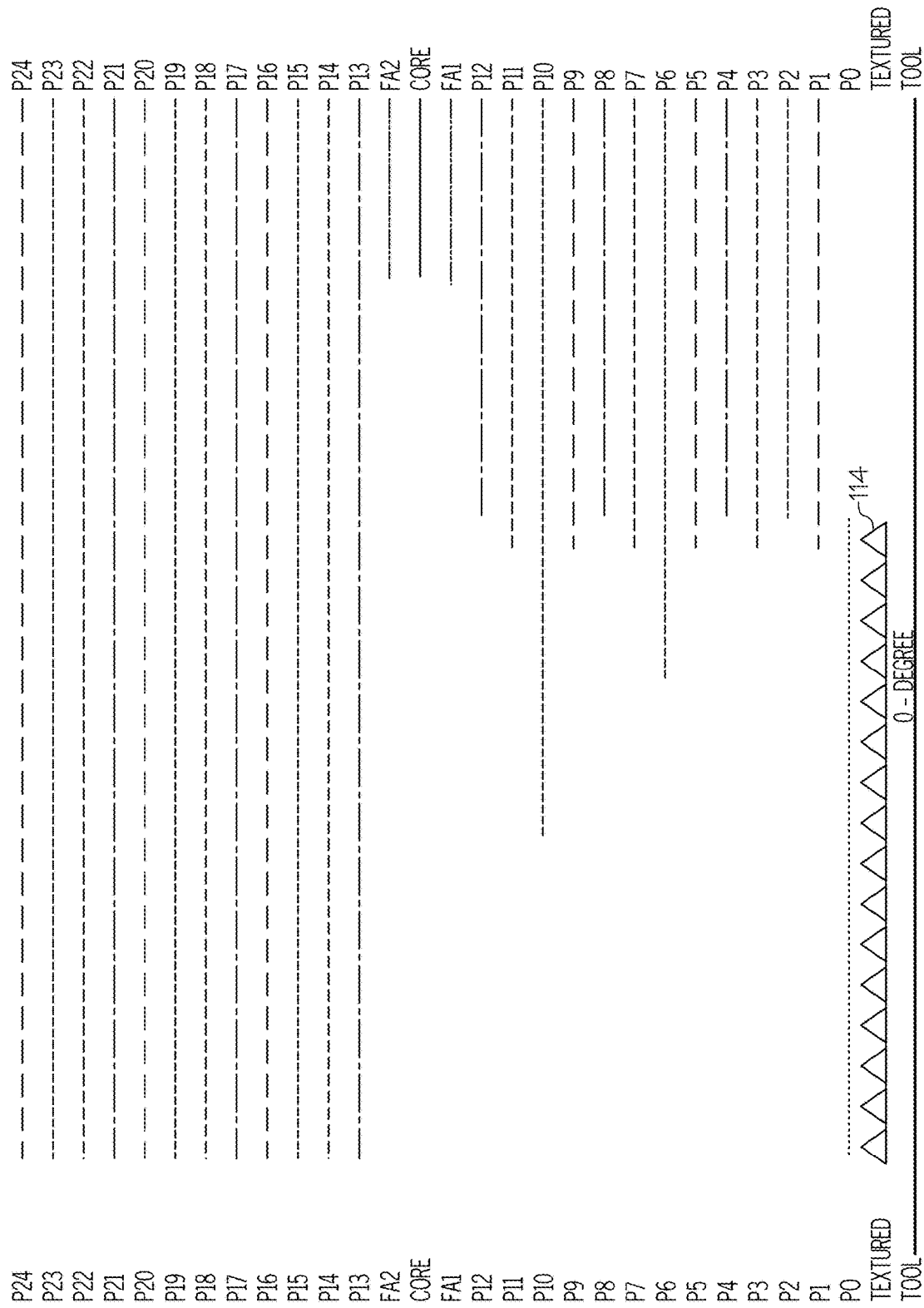
FIG. 2 is a schematic of an example of a layup of a composite honeycomb core sandwich structure for 0-degree ply orientation.
Figure 3:
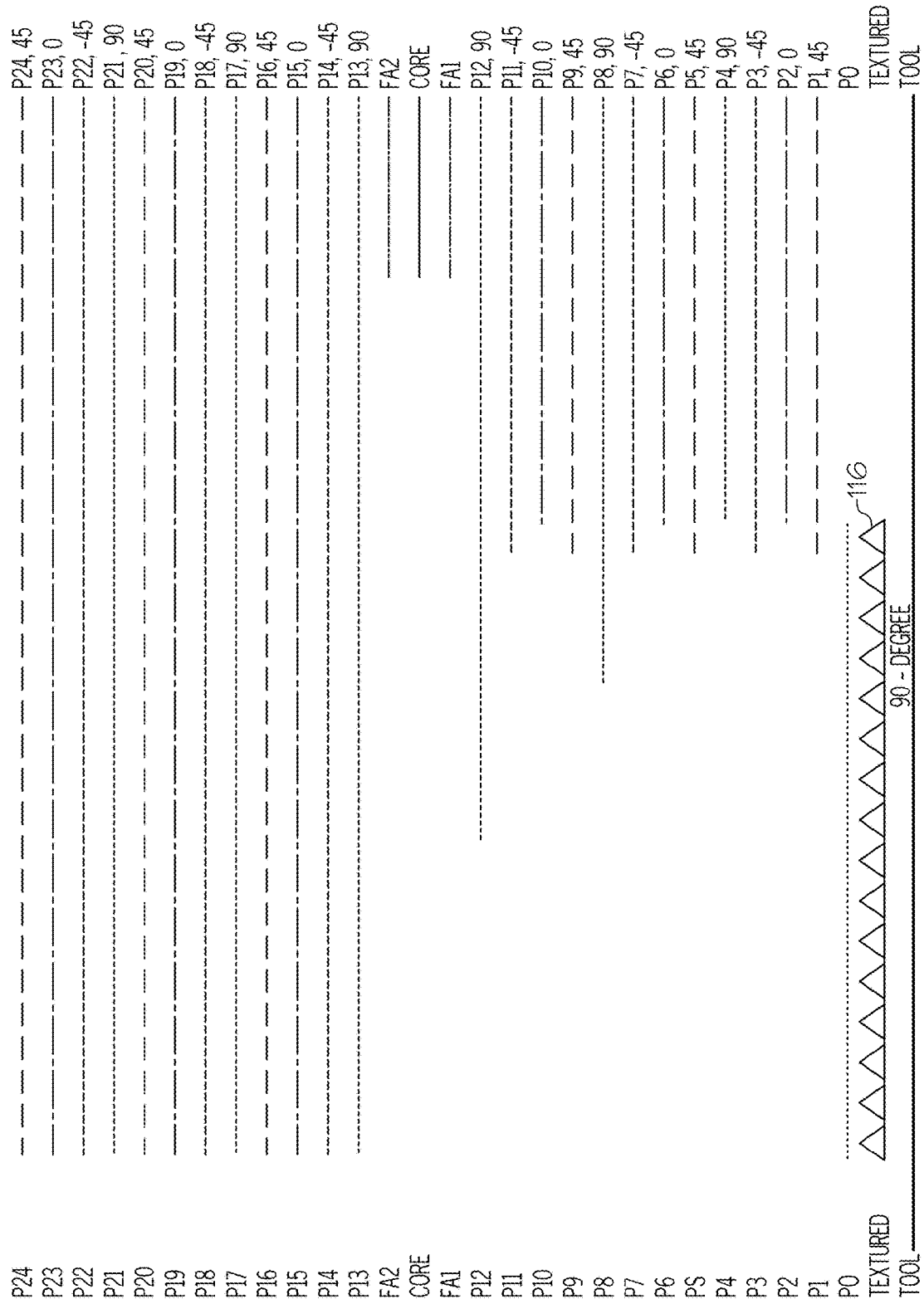
FIG. 3 is a schematic of another example of a layup of a composite honeycomb core sandwich structure for 90-degree ply orientation.
Figure 4:
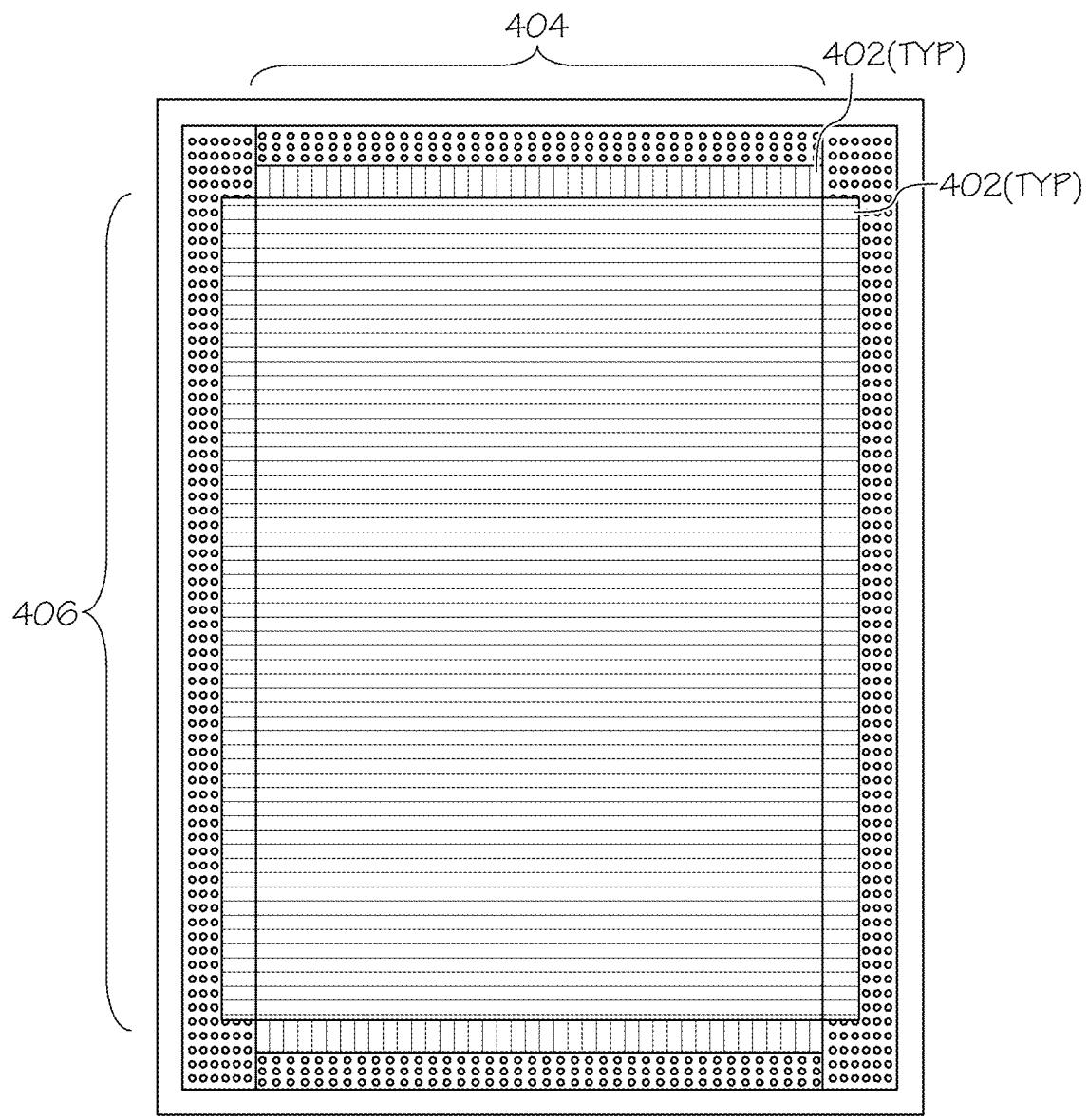
FIG. 4 is a top view of an example of a layup of a stack of under-core composite plies on the tool of FIG. 1.

The demonstration article was designed in a quasi-isotropic, balanced and symmetric layup. The schematic in FIG. 2 shows how the 0-degree plies (i.e., P2, P6, P10, P15, P19 and P23) were laid up. The drawing also shows how the +45-degree plies (i.e., P1, P5, P9, P16, P20 and P24) and the −45-degree plies (i.e., P3, P7, P11, P14, P18 and P22) were laid up. FIG. 2 also shows how the 0-degree plies extend onto the grit strip 110. FIG. 3 shows a similar schematic for the plies that are at 90-degrees orientation, perpendicular to the other tie down ply. FIG. 4 shows the under-core composite plies 604 for the demonstration article before the honeycomb core 606 was installed. The 0-degree plies 404 run in the up and down direction, and the 90-degree plies 406 run in the left and right direction. The plies extend to cover half of the grit strip 110 as shown in FIGS. 2 and 3. The demonstration method proved successful. During the fabrication of the demonstration article no honeycomb core movement or crush was observed.

Figure 5:
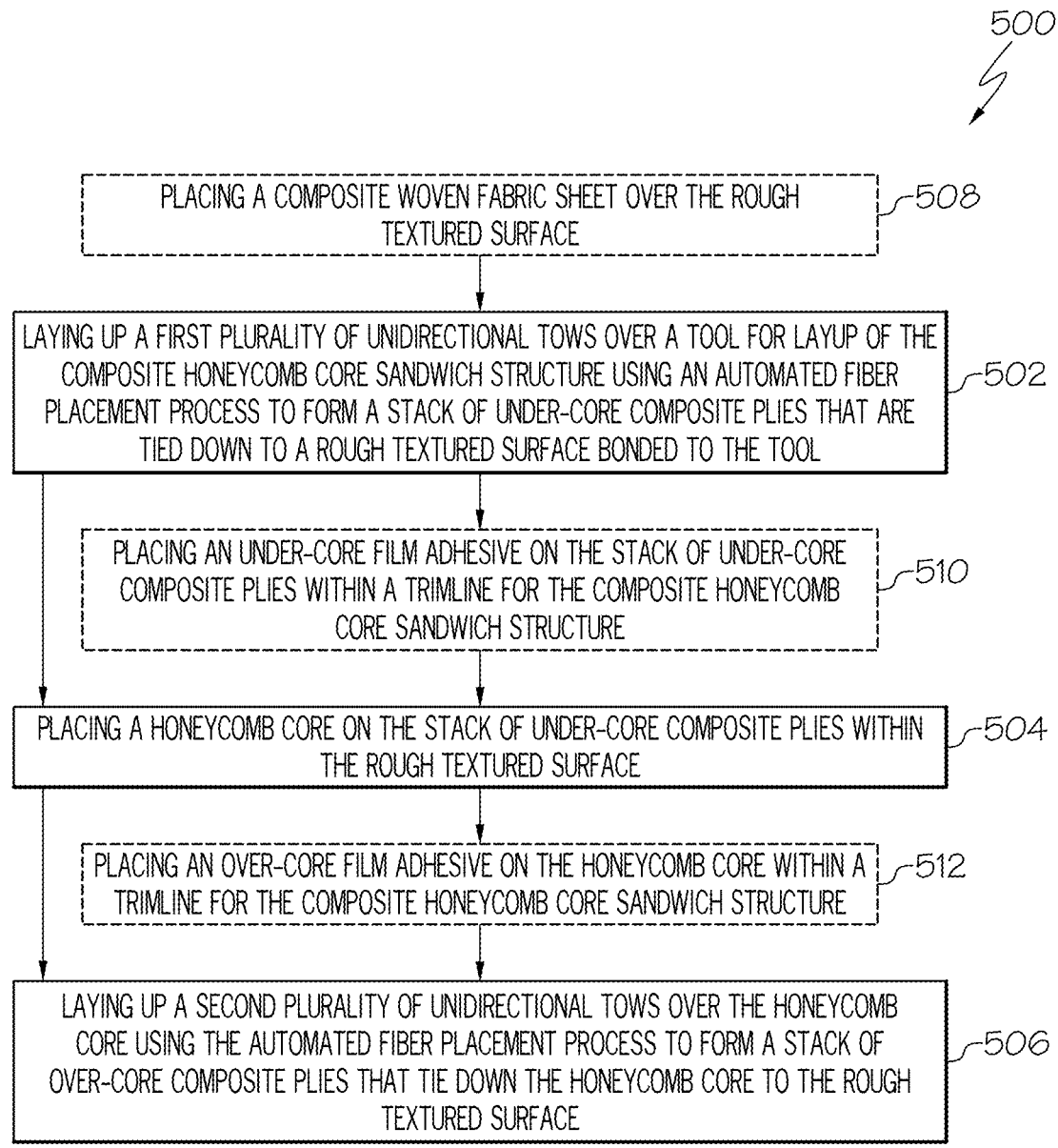
FIG. 5 is a flow diagram of an example of a method for fabrication of a layup for a composite honeycomb core sandwich structure.
Figure 6A:
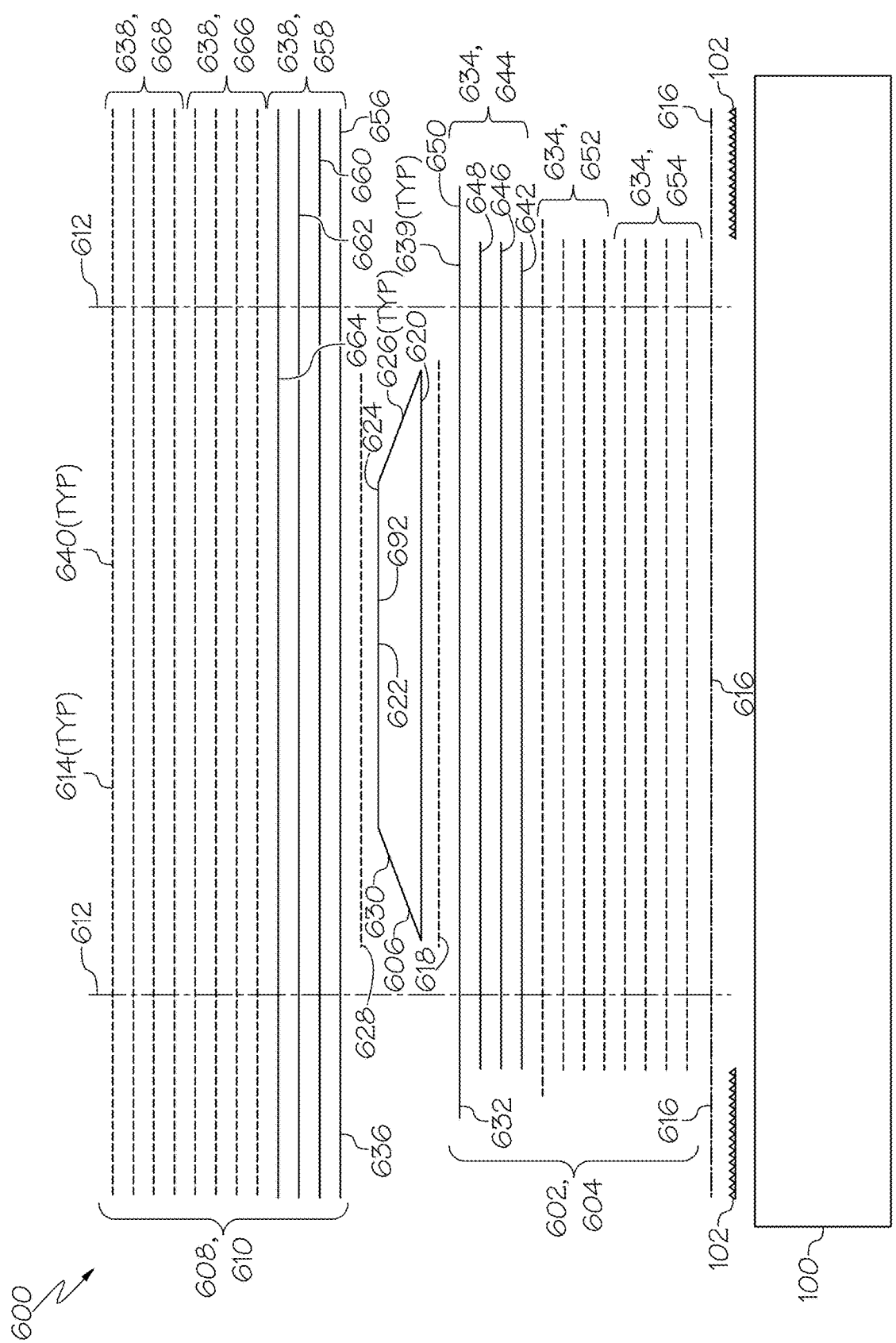
FIG. 6A-B are exploded views of examples of layups for a composite honeycomb core sandwich structure on the tool of FIG. 1.
Figure 6B:
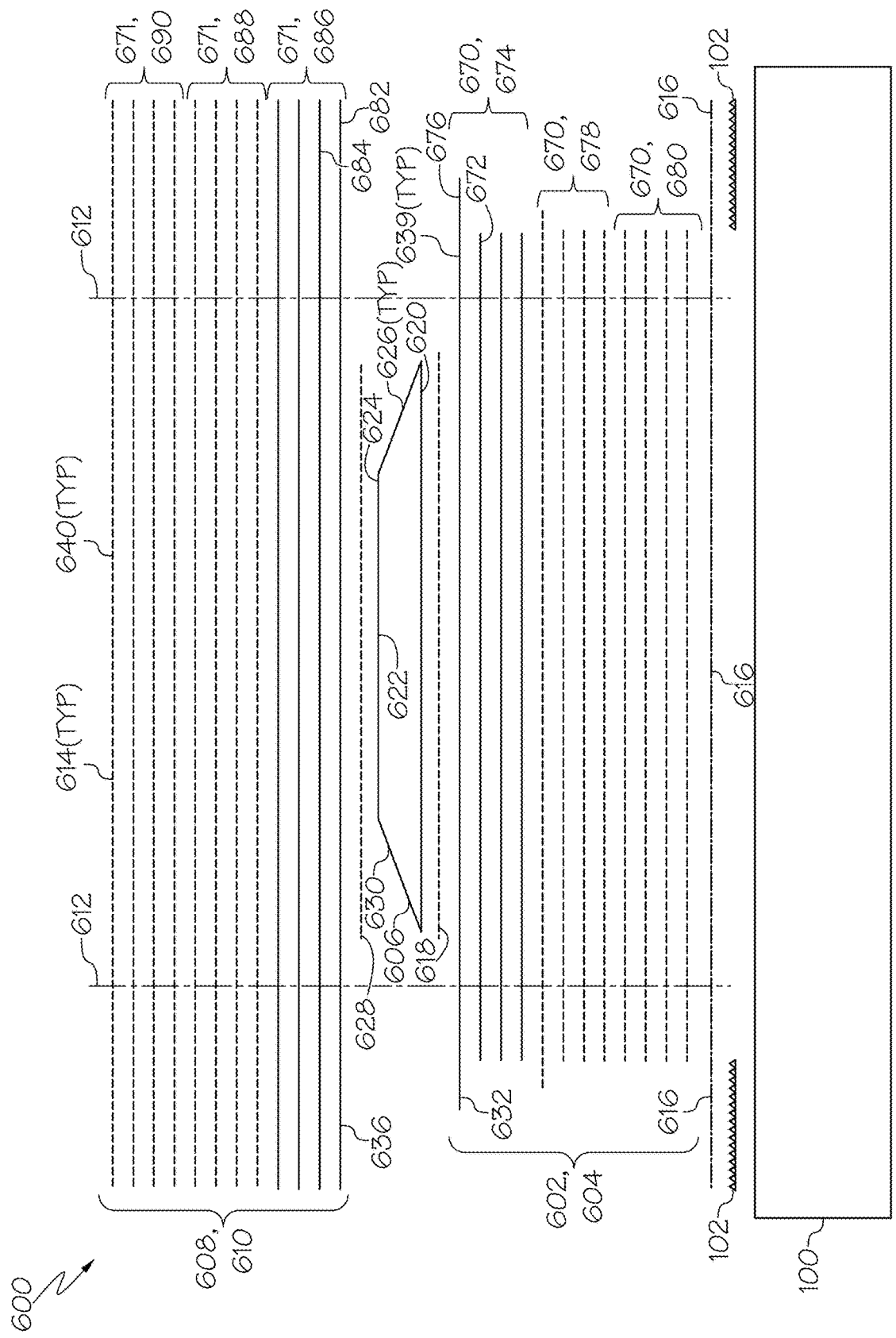
Figure 7:
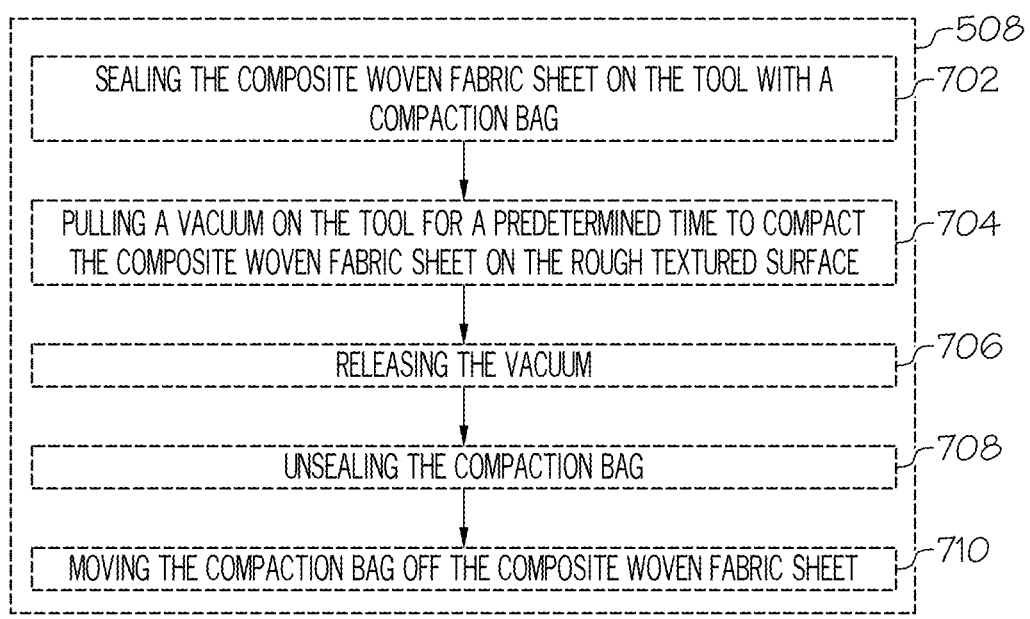
FIG. 7 is a flow diagram of an example of the placing of the composite woven fabric sheet of FIG. 5.
Figure 8:
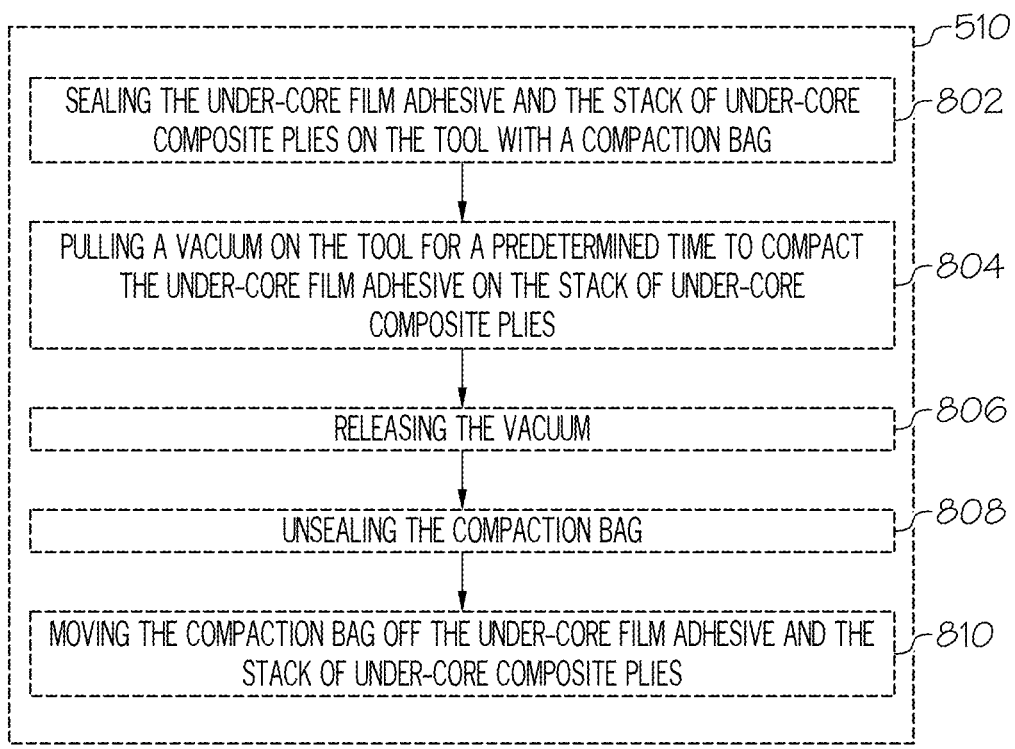
FIG. 8 is a flow diagram of an example of the placing of the under-core film adhesive of FIG. 5.
Figure 9:
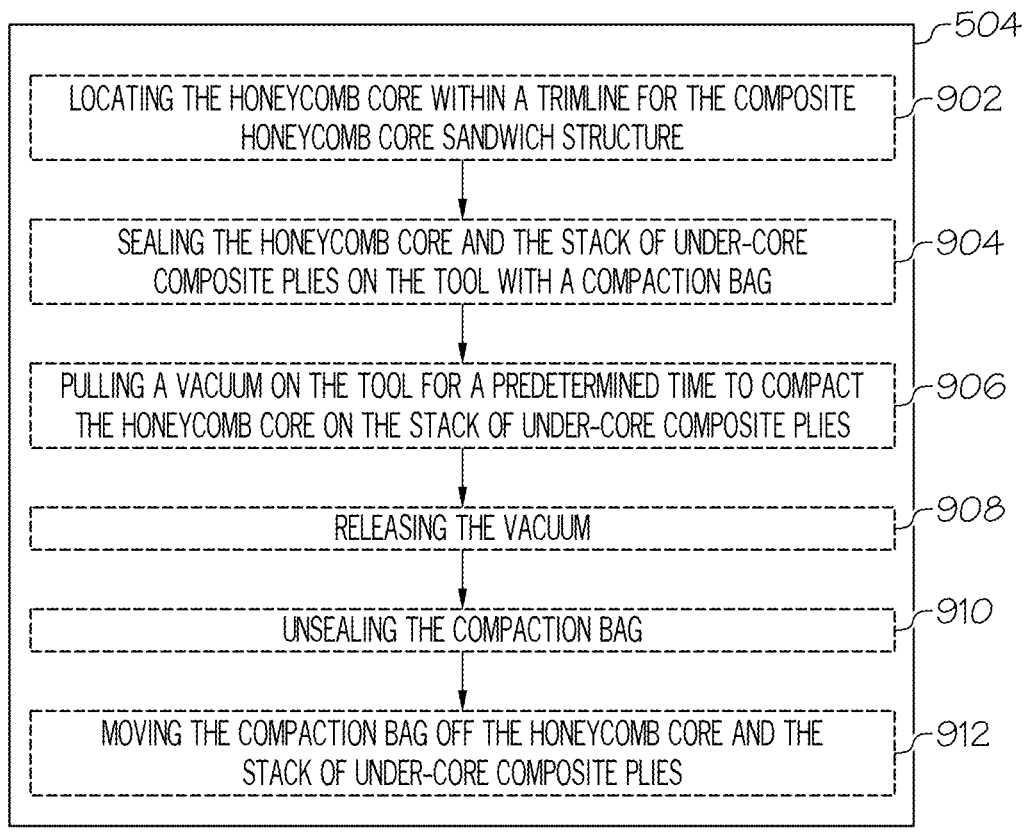
FIG. 9 is a flow diagram of an example of the placing of the honeycomb core of FIG. 5.
Figure 10:
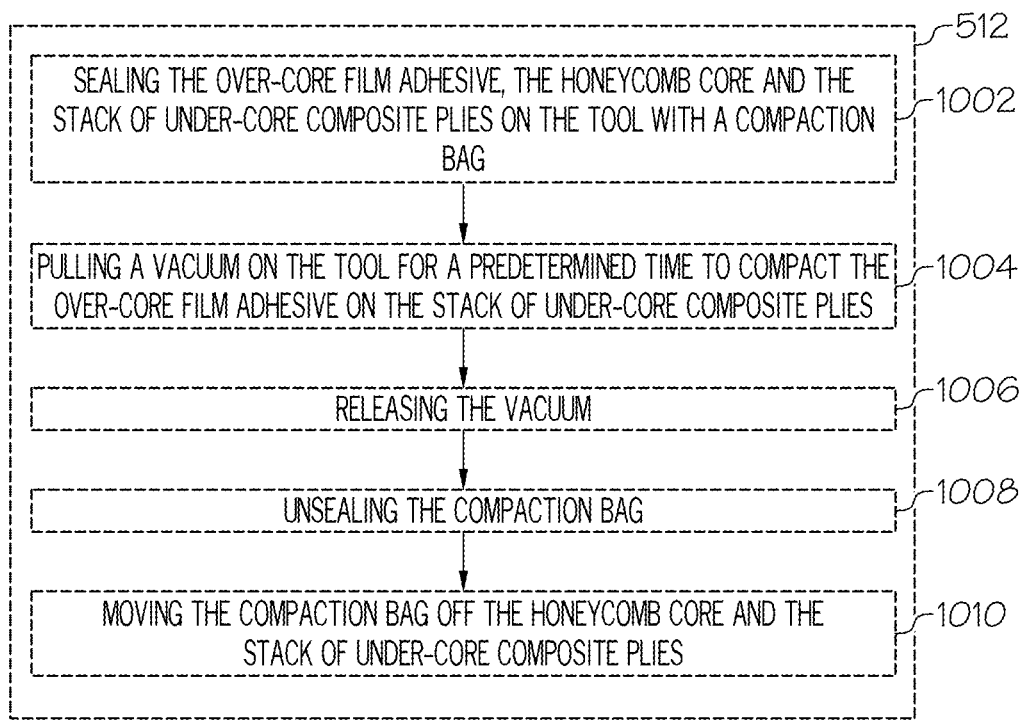
FIG. 10 is a flow diagram of an example of the placing of the over-core film adhesive of FIG. 5.
Figure 11:
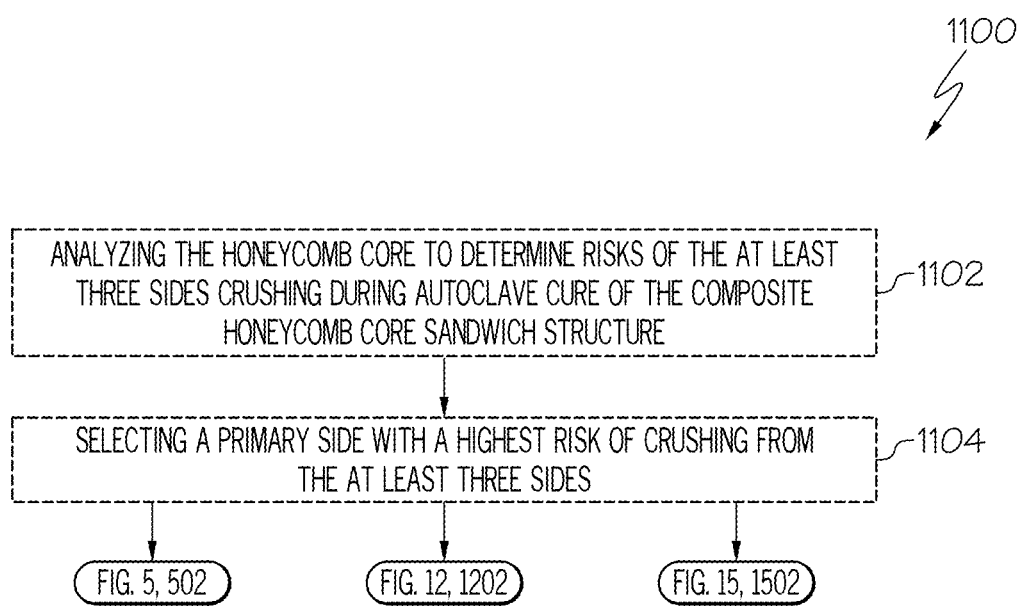
FIG. 11, in combination with FIG. 5, is a flow diagram of another example of a method for fabrication of a layup for a composite honeycomb core sandwich structure.
Figure 12:
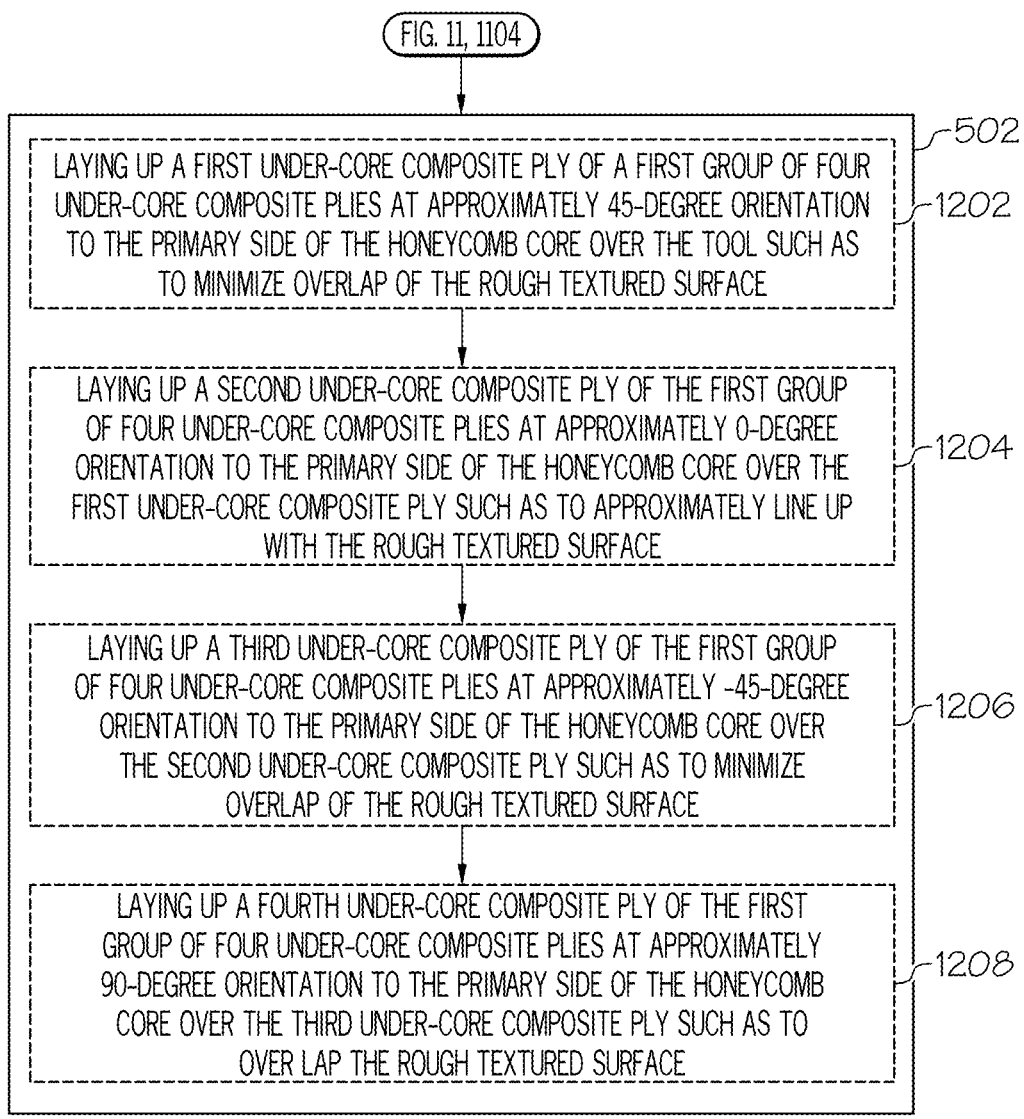
FIG. 12 is a flow diagram of an example of the laying up the first plurality of unidirectional tows of FIG. 5.
Figure 13:
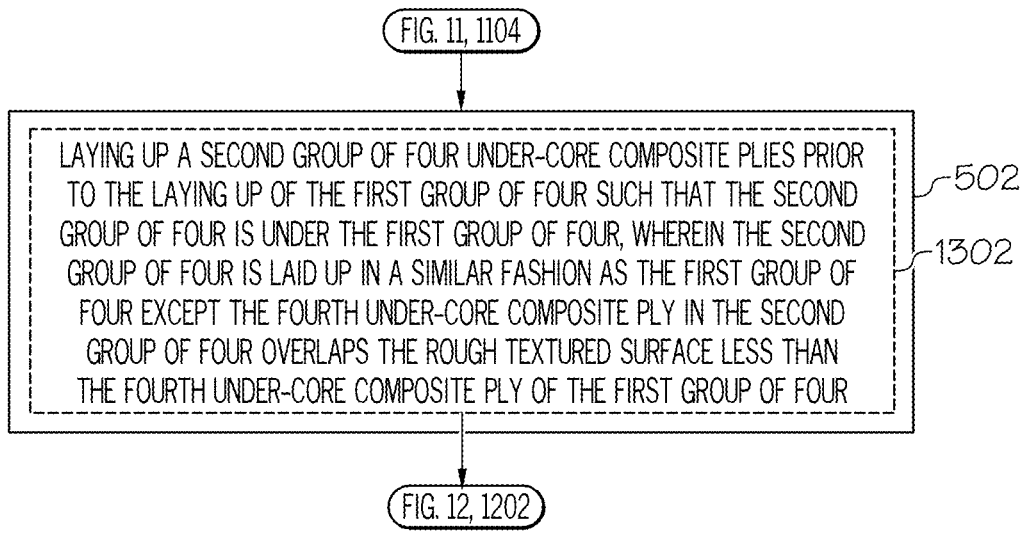
FIG. 13, in combination with FIG. 12, is a flow diagram of another example the laying up the first plurality of unidirectional tows of FIG. 5.

Referring generally to FIGS. 1, 4-21 and 31, by way of examples, the present disclosure is directed to a method 500, 1100, 1800, 1900, 2000, 3100, 3400 for fabrication of a layup 600 for a composite honeycomb core sandwich structure 2100. FIG. 1 provides a top view of an example of a tool 100 for layup 600 of a composite honeycomb core sandwich structure 2100. FIG. 4 provides an example of the layup 600 of a stack of under-core composite plies 604 on the tool 100 of FIG. 1. FIG. 5 provides an example of the method 500 for fabrication of a layup for a composite honeycomb core sandwich structure. FIG. 6 is an exploded view of an example of the layup 600 for a composite honeycomb core sandwich structure 2100 on the tool 100 of FIG. 1. FIG. 7 provides an example of the placing 508 of the composite woven fabric sheet 616 of FIG. 5. FIG. 8 provides an example of the placing 510 of the under-core film adhesive 618 of FIG. 5. FIG. 9 provides an example of the placing 504 of the honeycomb core 606 of FIG. 5. FIG. 10 provides an example of the placing 512 of the over-core film adhesive 628 of FIG. 5. FIG. 11, in combination with FIG. 5, provides an example of the method 1100 for fabrication of a layup 600 for a composite honeycomb core sandwich structure 2100. FIG. 12 provides an example of the laying up 502 of the first plurality of unidirectional tows 602 of FIG. 5. FIG. 13, in combination with FIG. 12, provides another example of the laying up 502 of the first plurality of unidirectional tows 602 of FIG. 5.

Figure 14:
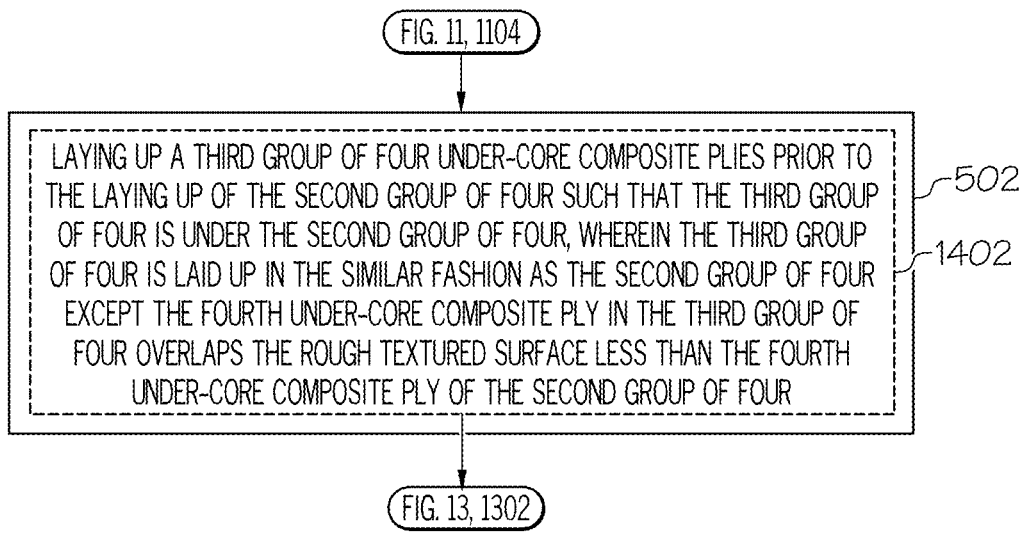
FIG. 14, in combination with FIG. 12 and FIG. 13, is a flow diagram of yet another example the laying up the first plurality of unidirectional tows of FIG. 5.
Figure 15:
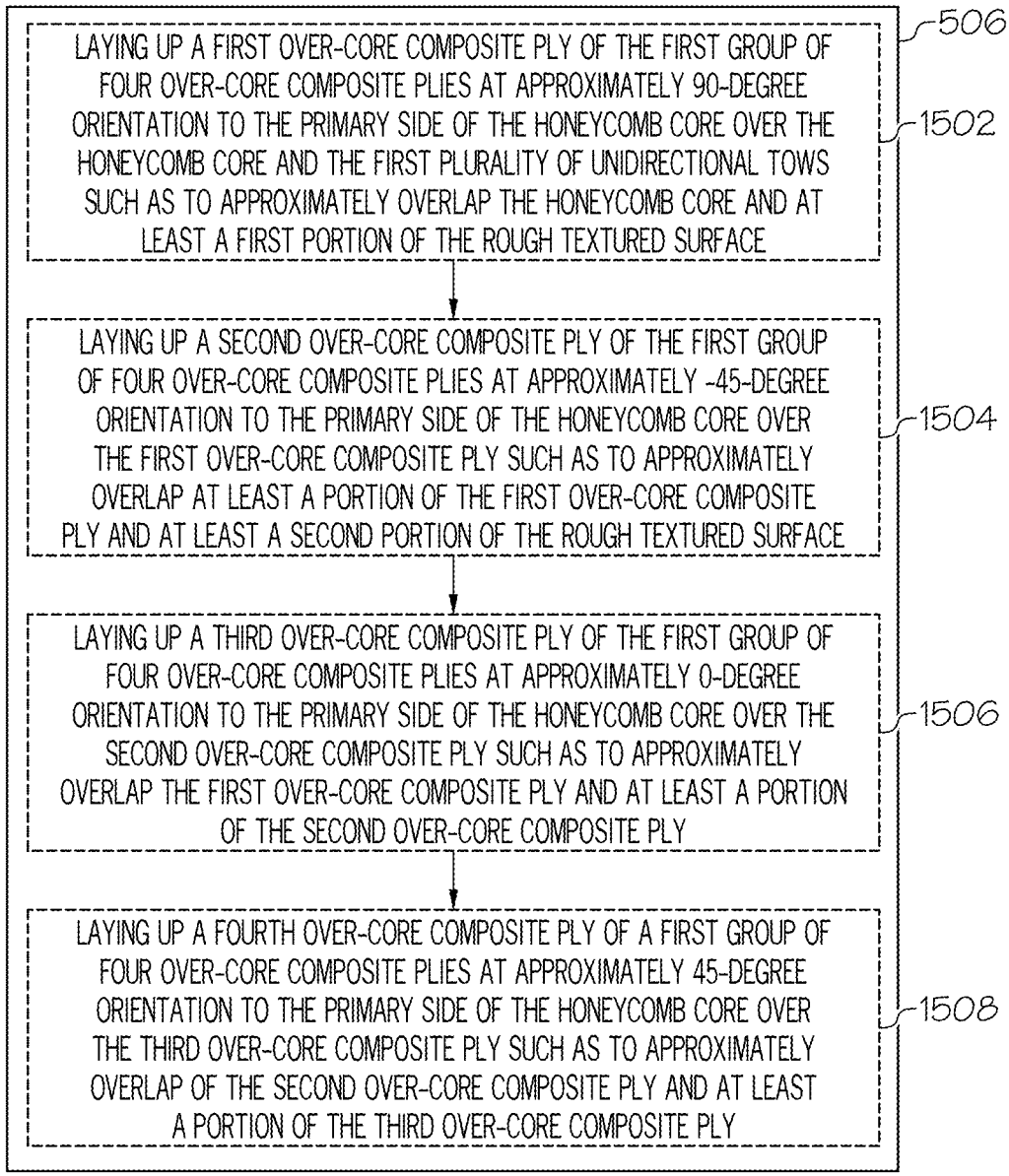
FIG. 15 is a flow diagram of an example of the laying up the second plurality of unidirectional tows of FIG. 5.
Figure 16:
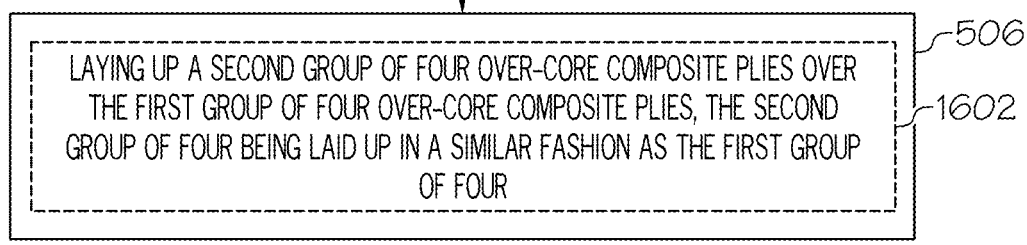
FIG. 16, in combination with FIG. 15, is a flow diagram of another example the laying up the second plurality of unidirectional tows of FIG. 5.
Figure 17:
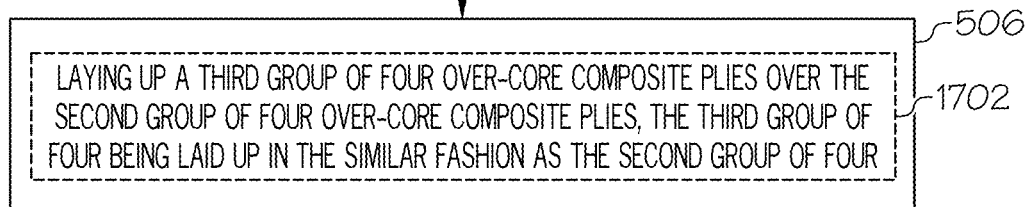
FIG. 17, in combination with FIG. 15 and FIG. 16, is a flow diagram of yet another example the laying up the second plurality of unidirectional tows of FIG. 5.
Figure 18:
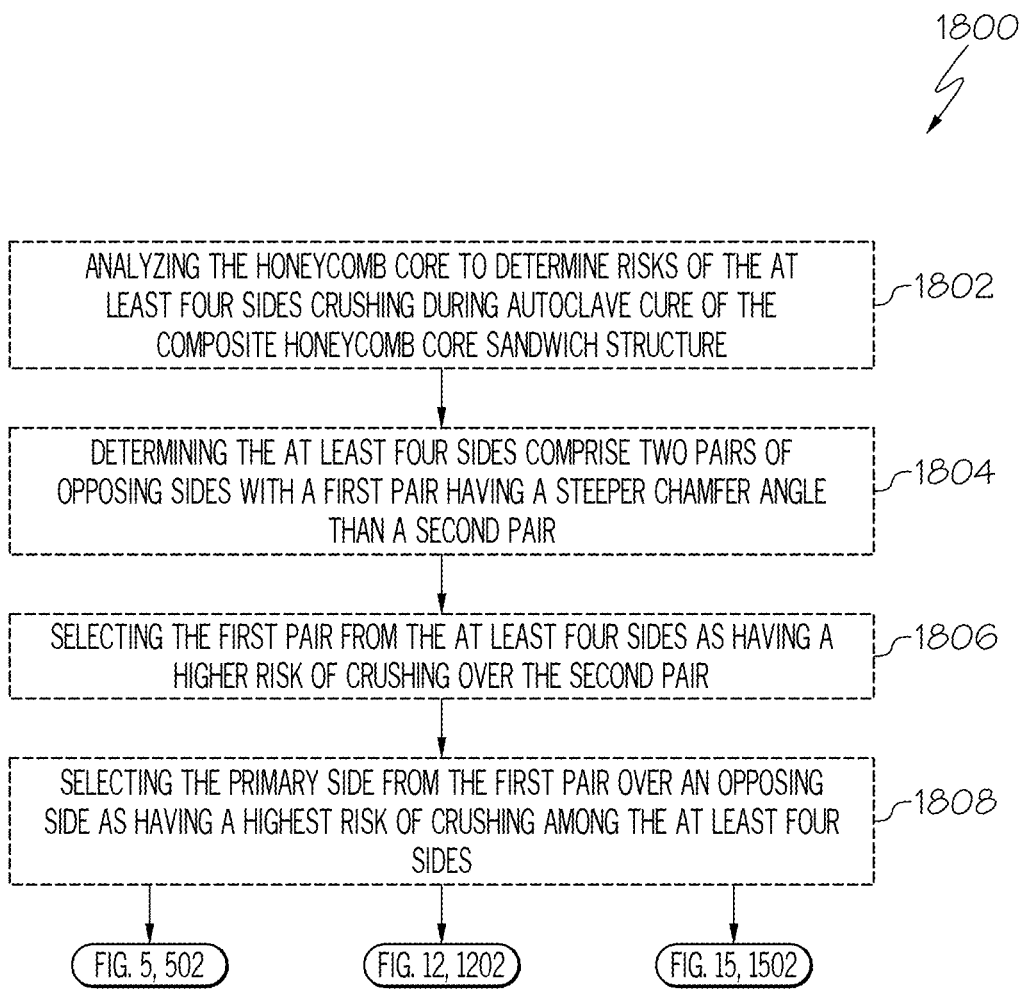
FIG. 18, in combination with FIG. 5, is a flow diagram of yet another example of a method for fabrication of a layup for a composite honeycomb core sandwich structure.
Figure 19:
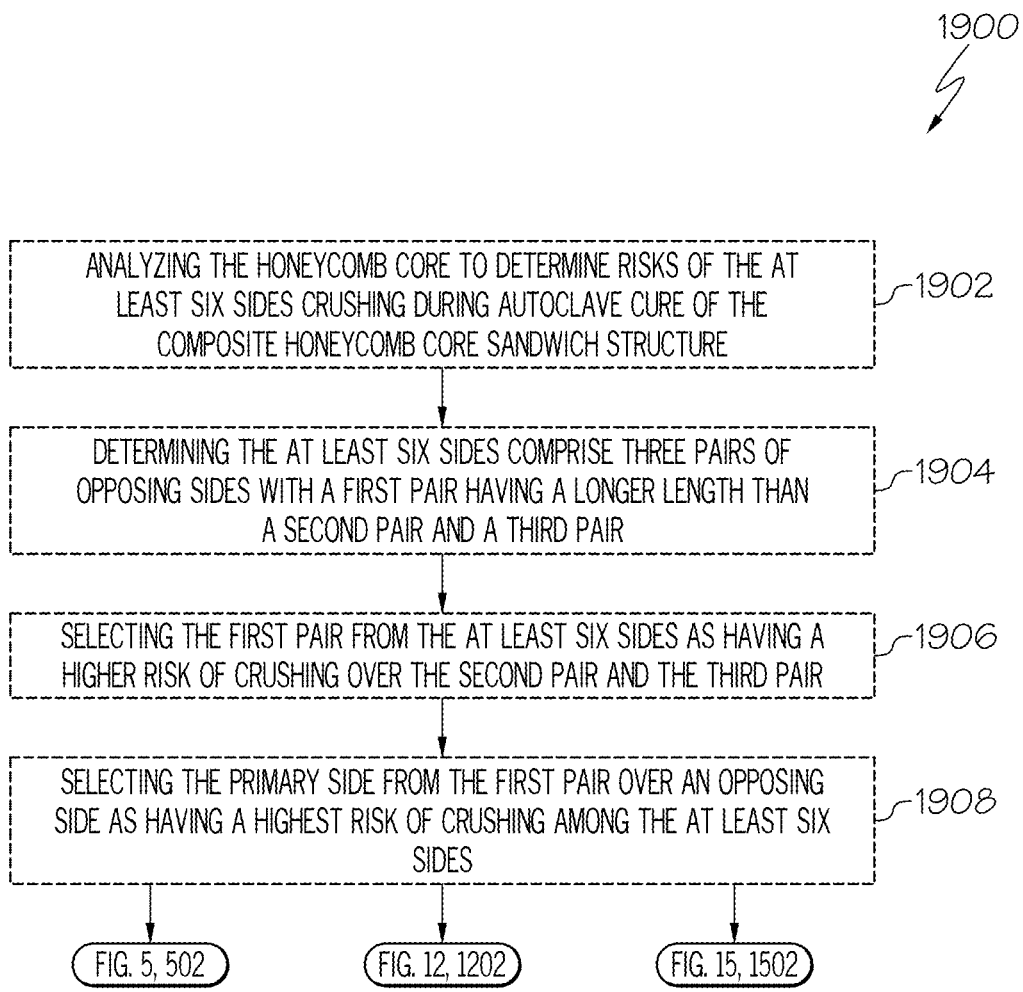
FIG. 19, in combination with FIG. 5, is a flow diagram of still another example of a method for fabrication of a layup for a composite honeycomb core sandwich structure.
Figure 20:
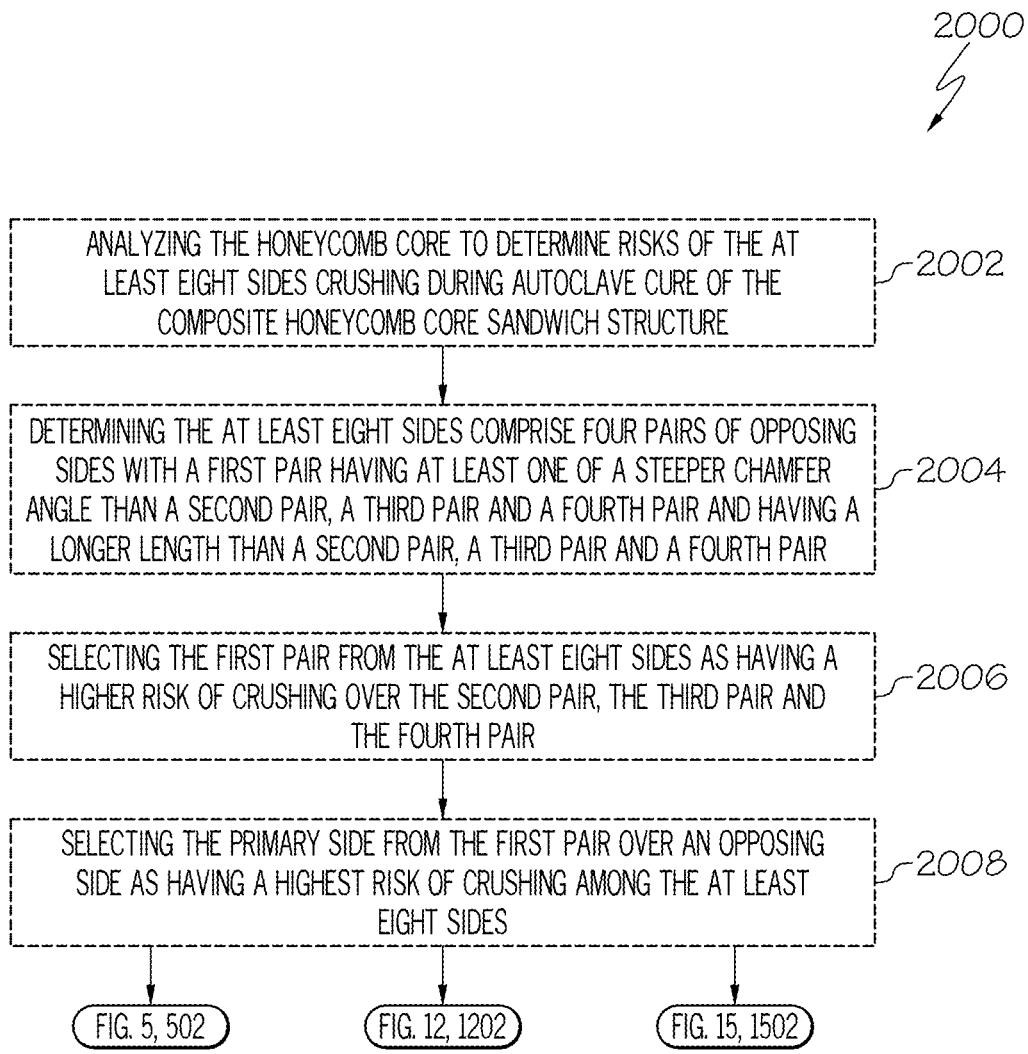
FIG. 20, in combination with FIG. 5, is a flow diagram of still yet another example of a method for fabrication of a layup for a composite honeycomb core sandwich structure.
Figure 21:
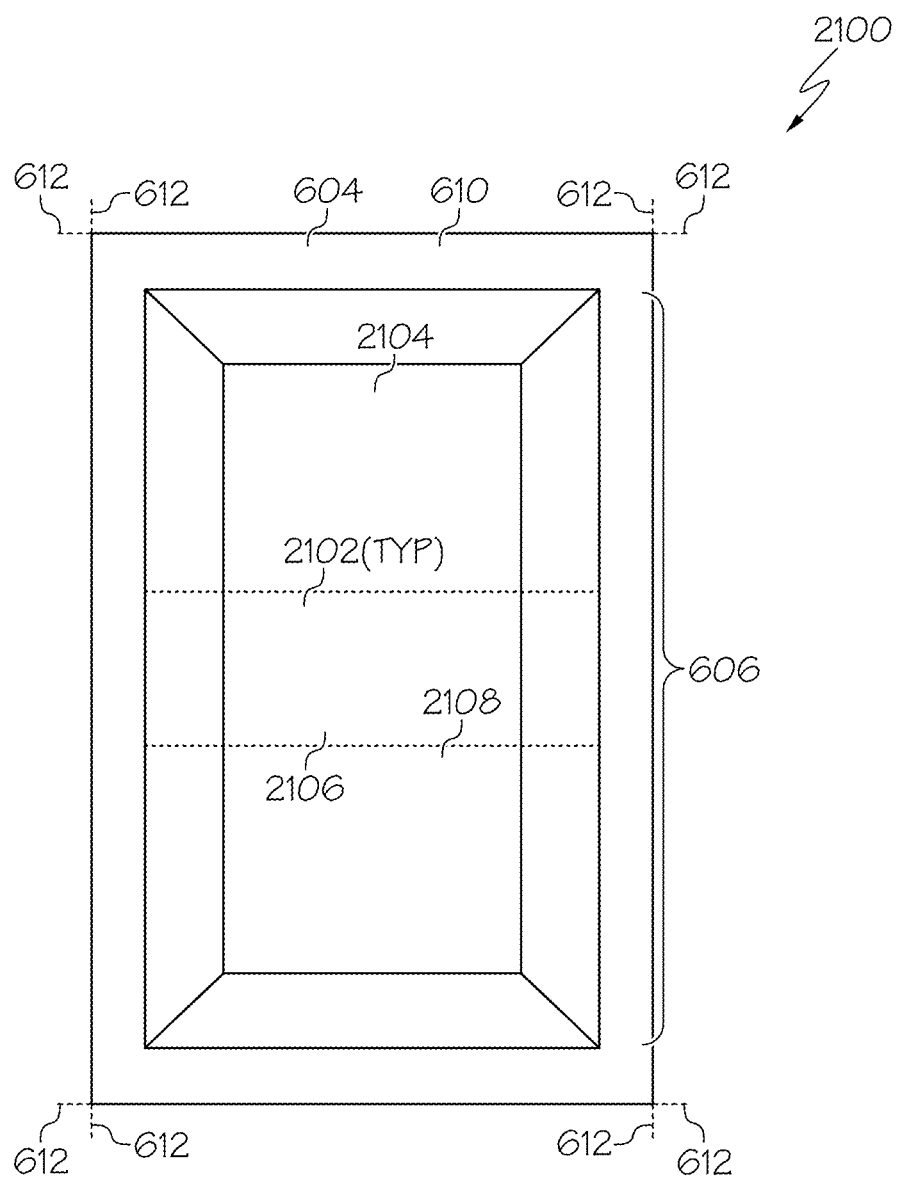
FIG. 21 is a top view of an example of a composite honeycomb core sandwich structure.
Figure 22:
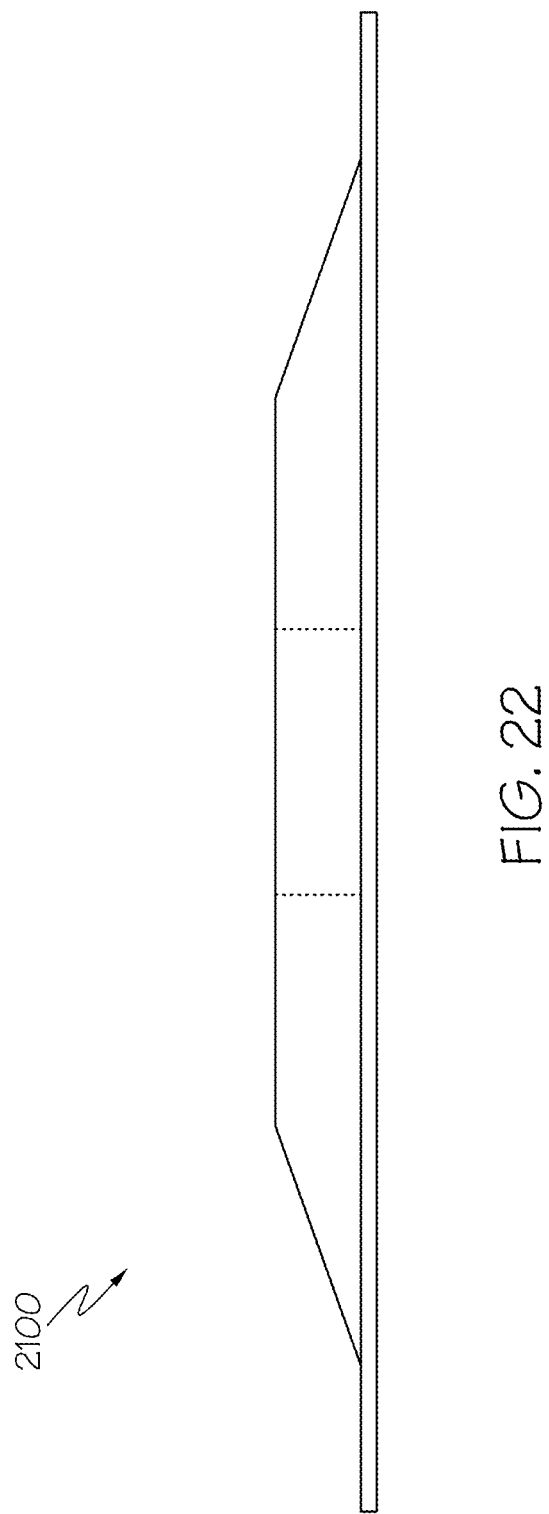
FIG. 22 is a side view of the composite honeycomb core sandwich structure of FIG. 21.
Figure 23:
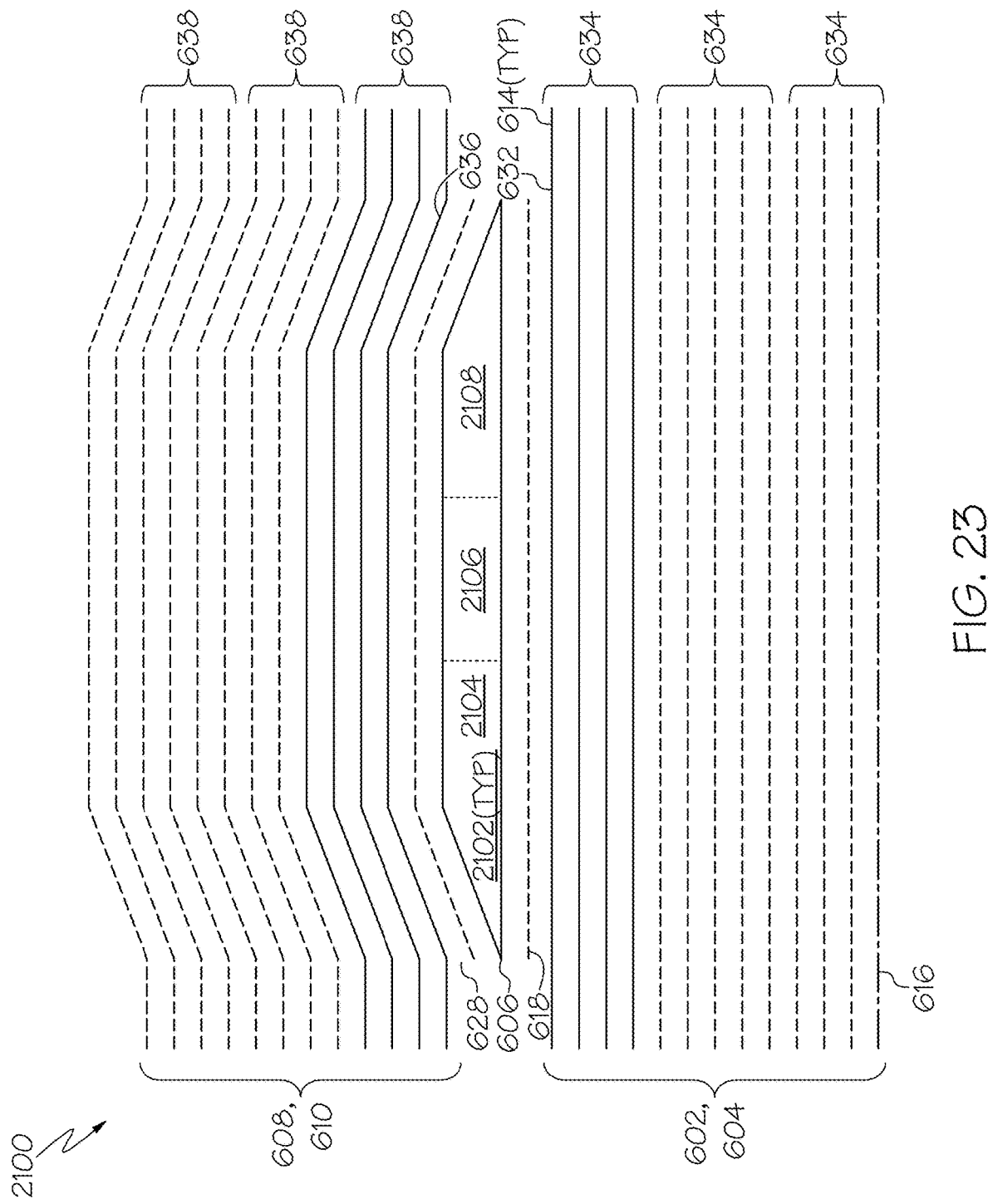
FIG. 23 is an exploded view of the composite honeycomb core sandwich structure of FIG. 22.
Figure 31:
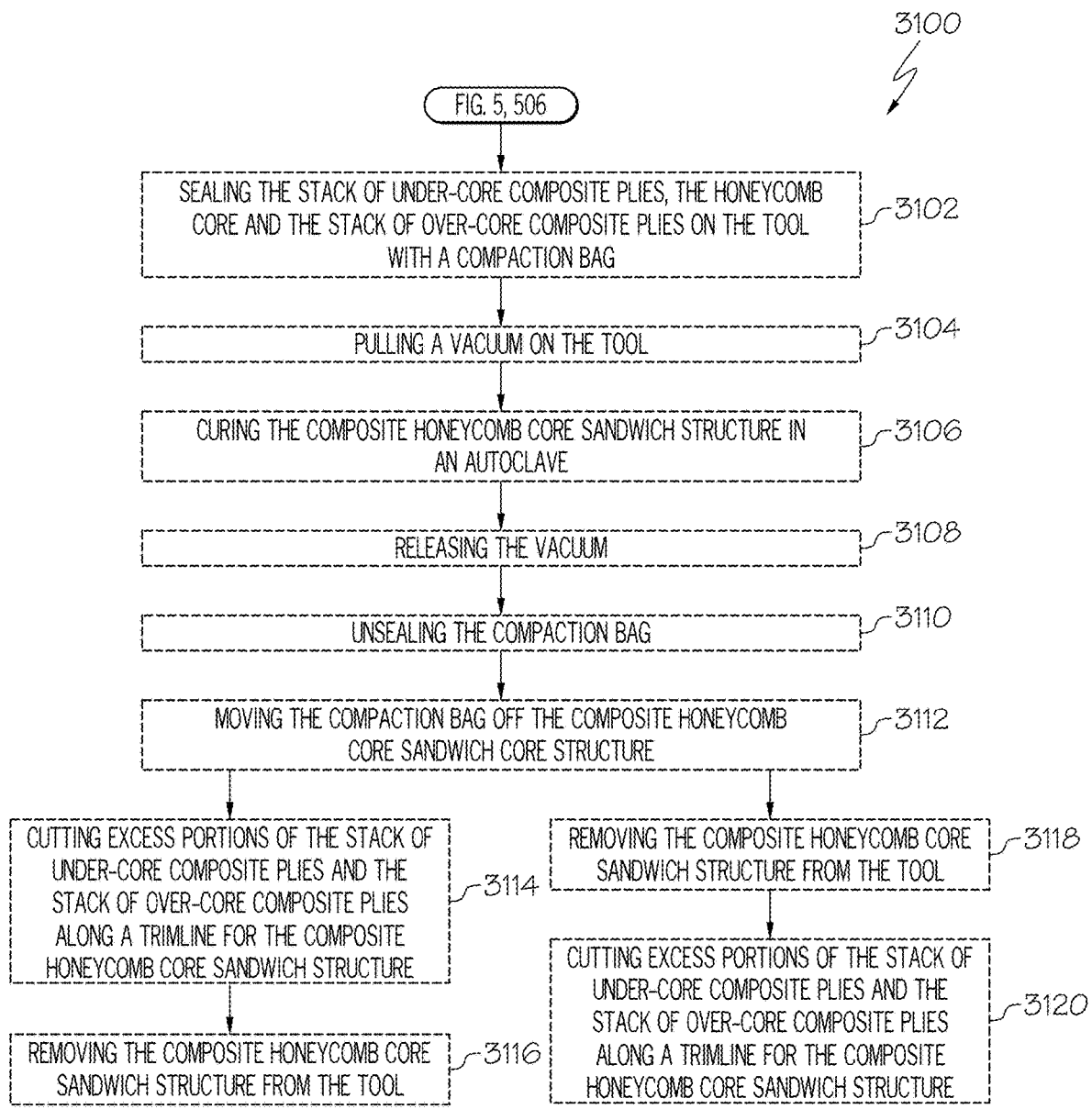
FIG. 31, in combination with FIG. 5, is a flow diagram of still yet another example of a method for fabrication of a layup for a composite honeycomb core sandwich structure.

FIG. 14, in combination with FIG. 12 and FIG. 13, provides yet another example the laying up 502 of the first plurality of unidirectional tows 602 of FIG. 5. FIG. 15 provides an example of the laying up 506 of the second plurality of unidirectional tows 608 of FIG. 5. FIG. 16, in combination with FIG. 15, provides another example of the laying up 506 of the second plurality of unidirectional tows 608 of FIG. 5. FIG. 17, in combination with FIG. 15 and FIG. 16, provides yet another example of the laying up 506 of the second plurality of unidirectional tows 608 of FIG. 5. FIG. 18, in combination with FIG. 5, provides an example of the method 1800 for fabrication of a layup 600 for a composite honeycomb core sandwich structure 2100. FIG. 19, in combination with FIG. 5, provides an example of the method 1900 for fabrication of a layup 600 for a composite honeycomb core sandwich structure 2100. FIG. 20, in combination with FIG. 5, provides an example of the method 2000 for fabrication of a layup 600 for a composite honeycomb core sandwich structure 2100. FIG. 21 provides an example of a composite honeycomb core sandwich structure 2100. FIG. 31, in combination with FIG. 5, provides an example of the method 3100 for fabrication of a layup 600 for a composite honeycomb core sandwich structure 2100.

With reference again to FIGS. 1, 4-10 and 21, in one or more examples, a method 500 (see FIG. 5) for fabrication of a layup 600 for a composite honeycomb core sandwich structure 2100 includes laying up 502 a first plurality of unidirectional tows 602 over a tool 100 for layup 600 of the composite honeycomb core sandwich structure 2100 using an automated fiber placement process to form a stack of under-core composite plies 604 that are tied down to a rough textured surface 102 bonded to the tool 100. At 504, a honeycomb core 606 is placed on the stack of under-core composite plies 604 within the rough textured surface 102. At 506, a second plurality of unidirectional tows 608 is laid up over the honeycomb core 606 using the automated fiber placement process to form a stack of over-core composite plies 610 that tie down the honeycomb core 606 to the rough textured surface 102.

In another example of the method 500, the first plurality of unidirectional tows 602 extend beyond a trimline 612 for the composite honeycomb core sandwich structure 2100. In yet another example of the method 500, each unidirectional tow 614 includes unidirectional reinforcement fibers impregnated with a polymer resin to form a composite unidirectional tape 402. In a further example, the unidirectional reinforcement fibers include carbon fibers, glass fibers, polyaramid fibers, acrylic fibers, viscose rayon fibers or any other suitable reinforcement fibers in any suitable combination. In still another example of the method 500, orientations of the stack of under-core composite plies 604 are quasi-isotropic.

In still yet another example of the method 500, the rough textured surface 102 is disposed on the tool 100 to frame a trimline 612 for the composite honeycomb core sandwich structure 2100. In another example of the method 500, the rough textured surface 102 includes a grit strip 110 or any other suitable rough textured surface in any suitable combination. In yet another example of the method 500, the honeycomb core 606 is placed within a trimline 612 for the composite honeycomb core sandwich structure 2100. In still another example of the method 500, the second plurality of unidirectional tows 608 extend beyond a trimline 612 for the composite honeycomb core sandwich structure 2100. In still yet another example of the method 500, orientations of the stack of over-core composite plies 610 are quasi-isotropic. In another example of the method 500, orientations of the stack of over-core composite plies 610 are symmetrical to orientations of the stack of under-core composite plies 604 in relation to the honeycomb core 606.

In yet another example, the method 500 also includes placing 508 a composite woven fabric sheet 616 over the rough textured surface 102. In a further example, the composite woven fabric sheet 616 is impregnated with a polymer resin and includes a fiberglass sheet, a carbon fiber sheet, a polyaramid sheet or any other suitable composite woven fabric sheet in any suitable combination. In another further example, the composite woven fabric sheet 616 is sized to fit over the rough textured surface 102 and to frame a trimline 612 for the composite honeycomb core sandwich structure 2100. In yet another further example, the composite woven fabric sheet 616 is sized to fit over the rough textured surface 102 and a portion 104 of a top surface 106 of the tool 100 framed by the rough textured surface 102. In still another further example, the composite woven fabric sheet 616 is sized to fit over the rough textured surface 102, a first portion 104 of a top surface 106 of the tool 100 framed by the rough textured surface 102 and a second portion 108 of the top surface 106 of the tool 100 outside the rough textured surface 102. In still yet another further example, the placing 508 of the composite woven fabric sheet 616 includes sealing 702 (see FIG. 7) the composite woven fabric sheet 616 on the tool 100 with a compaction bag 112. At 704, a vacuum is pulled on the tool 100 for a predetermined time to compact the composite woven fabric sheet 616 on the rough textured surface 102. At 706, the vacuum is released. At 708, the compaction bag 112 is unsealed. At 710, the compaction bag 112 is moved off the composite woven fabric sheet 616.

In still another example, the method 500 also includes placing 510 an under-core film adhesive 618 on the stack of under-core composite plies 604 within a trimline 612 for the composite honeycomb core sandwich structure 2100. In a further example, the under-core film adhesive 618 includes an epoxy film adhesive, a polyurethane film adhesive, a polyimide film adhesive or any other suitable adhesive in any suitable combination. In another further example, the under-core film adhesive 618 is sized to fit under a bottom surface 620 of the honeycomb core 606. In yet another further example, the placing 510 of the under-core film adhesive 618 includes sealing 802 (see FIG. 8) the under-core film adhesive 618 and the stack of under-core composite plies 604 on the tool 100 with a compaction bag 112. At 804, a vacuum is pulled on the tool 100 for a predetermined time to compact the under-core film adhesive 618 on the stack of under-core composite plies 604. At 806, the vacuum is released. At 808, the compaction bag 112 is unsealed. At 810, the compaction bag 112 is moved off the under-core film adhesive 618 and the stack of under-core composite plies 604.

In still yet another example of the method 500, the honeycomb core 606 includes a three-dimensional body 622 with a top surface 624, a bottom surface 620 and at least three sides 626 chamfered from the top surface 624 toward the bottom surface 620.

In another example of the method 500, the placing 504 of the honeycomb core 606 includes locating 902 (see FIG. 9) the honeycomb core 606 within a trimline 612 for the composite honeycomb core sandwich structure 2100. At 904, the honeycomb core 606 and the stack of under-core composite plies 604 are sealed on the tool 100 with a compaction bag 112. At 906, a vacuum is pulled on the tool 100 for a predetermined time to compact the honeycomb core 606 on the stack of under-core composite plies 604. At 908, the vacuum is released. At 910, the compaction bag 112 is unsealed. At 912, the compaction bag 112 is moved off the honeycomb core 606 and the stack of under-core composite plies 604.

In a further example, the honeycomb core 606 includes multiple segments 2102. In an even further example, the multiple segments 2102 of the honeycomb core 606 include a forward segment 2104, a center segment 2106 and an aft segment 2108. In another further example, the honeycomb core 606 includes a non-metallic material, a flame-resistant meta-aramid material, an aramid paper material, a fiberglass material, a metallic material, an aluminum material or any other suitable material in any suitable combination. In yet another further example, the honeycomb core 606 is located using at least two tool pins. Other techniques for locating the honeycomb core 606 are also possible, such as using overhead laser templates.

In another example, the method 500 also includes placing 512 an over-core film adhesive 628 on the honeycomb core 606 within a trimline 612 for the composite honeycomb core sandwich structure 2100. In a further example, the over-core film adhesive 628 includes an epoxy film adhesive, a polyurethane film adhesive, a polyimide film adhesive or any other suitable adhesive in any suitable combination. In another further example, the over-core film adhesive 628 is sized to fit over a top surface 624 and sides 626 of the honeycomb core 606. In yet another further example, the placing 512 of the over-core film adhesive 628 includes sealing 1002 (see FIG. 10) the over-core film adhesive 628, the honeycomb core 606 and the stack of under-core composite plies 604 on the tool 100 with a compaction bag 112. At 1004, a vacuum is pulled on the tool 100 for a predetermined time to compact the over-core film adhesive 628 on the stack of under-core composite plies 604. At 1006, the vacuum is released. At 1008, the compaction bag 112 is unsealed. At 1010, the compaction bag 112 is moved off the over-core film adhesive 628, the honeycomb core 606 and the stack of under-core composite plies 604.

With reference again to FIGS. 1, 5, 6, 11-17 and 21, in one or more examples, a method 1100 (see FIG. 11) for fabrication of a layup 600 for a composite honeycomb core sandwich structure 2100 includes the method 500 of FIG. 5. In the method 1100, the honeycomb core 606 includes a three-dimensional body 622 with a top surface 624, a bottom surface 620 and at least three sides 626 chamfered from the top surface 624 toward the bottom surface 620. The method 1100 includes analyzing 1102 the honeycomb core 606 to determine risks of the at least three sides 626 crushing during autoclave cure of the composite honeycomb core sandwich structure 2100. At 1104, a primary side 630 with a highest risk of crushing is selected from the at least three sides 626. The method 1100 continues from 1104 to 502 of FIG. 5.

In another example of the method 1100, the primary side 630 is selected based at least in part on the primary side 630 having a steepest chamfer of the at least three sides 626. In yet another example of the method 1100, the primary side 630 is selected based at least in part on the primary side 630 being a longest side of the at least three sides 626. In still another example of the method 1100, a last composite ply 632 in the stack of under-core composite plies 604 is closest to the honeycomb core 606 and is oriented perpendicular to the primary side 630. In a further example, each group of four 634 under-core composite plies 639 in the stack of under-core composite plies 604 are oriented in quasi-isotropic fashion based on orientation of the last composite ply 632 being perpendicular to the primary side 630. In another further example, each group of two 670 under-core composite plies 639 in the stack of under-core composite plies 604 are oriented in quasi-isotropic fashion based on orientation of the last composite ply 632 being perpendicular to the primary side 630.

In still yet another example of the method 1100, a first composite ply 636 in the stack of over-core composite plies 610 is closest to the honeycomb core 606 and is oriented perpendicular to the primary side 630. In a further example, each group of four 638 over-core composite plies 640 in the stack of over-core composite plies 610 are oriented in quasi-isotropic fashion based on orientation of the first composite ply 636 being perpendicular to the primary side 630. In another further example, each group of two 671 over-core composite plies 640 in the stack of over-core composite plies 610 are oriented in quasi-isotropic fashion based on orientation of the first composite ply 636 being perpendicular to the primary side 630.

In another example of the method 1100, the laying up 502 of the first plurality of unidirectional tows 602 includes laying up 1202 (see FIG. 12) a first under-core composite ply 642 of a first group of four 644 under-core composite plies 639 at approximately 45-degree orientation to the primary side 630 of the honeycomb core 606 over the tool 100 such as to minimize overlap of the rough textured surface 102. At 1204, a second under-core composite ply 646 of the first group of four 644 under-core composite plies 639 is laid up at approximately 0-degree orientation to the primary side 630 of the honeycomb core 606 over the first under-core composite ply 642 such as to approximately line up with the rough textured surface 102. At 1206, a third under-core composite ply 648 of the first group of four 644 under-core composite plies 639 is laid up at approximately −45-degree orientation to the primary side 630 of the honeycomb core 606 over the second under-core composite ply 646 such as to minimize overlap of the rough textured surface 102. At 1208, a fourth under-core composite ply 650 of the first group of four 658 over-core composite plies 640 is laid up at approximately 90-degree orientation to the primary side 630 of the honeycomb core 606 over the third under-core composite ply 648 such as to overlap the rough textured surface 102.

In a further example, the laying up 502 of the first plurality of unidirectional tows 602 also includes laying up 1302 (see FIG. 13) a second group of four 652 under-core composite plies 639 prior to the laying up 1202, 1204, 1206, 1208 of the first group of four 644 such that the second group of four 652 is under the first group of four 644. The second group of four 652 is laid up in a similar (e.g., same) fashion as the first group of four 644, except the fourth under-core composite ply 650 in the second group of four 652 overlaps the rough textured surface 102 less than the fourth under-core composite ply 650 of the first group of four 644.

In an even further example, the laying up 502 of the first plurality of unidirectional tows 602 also includes laying up 1402 (see FIG. 14) a third group of four 654 under-core composite plies 639 prior to the laying up 1302 of the second group of four 652 such that the third group of four 654 is under the second group of four 652. The third group of four 654 is laid up in the similar (e.g., same) fashion as the second group of four 652 except the fourth under-core composite ply 650 in the third group of four 654 overlaps the rough textured surface 102 less than the fourth under-core composite ply 650 of the second group of four 652.

Figure 32:
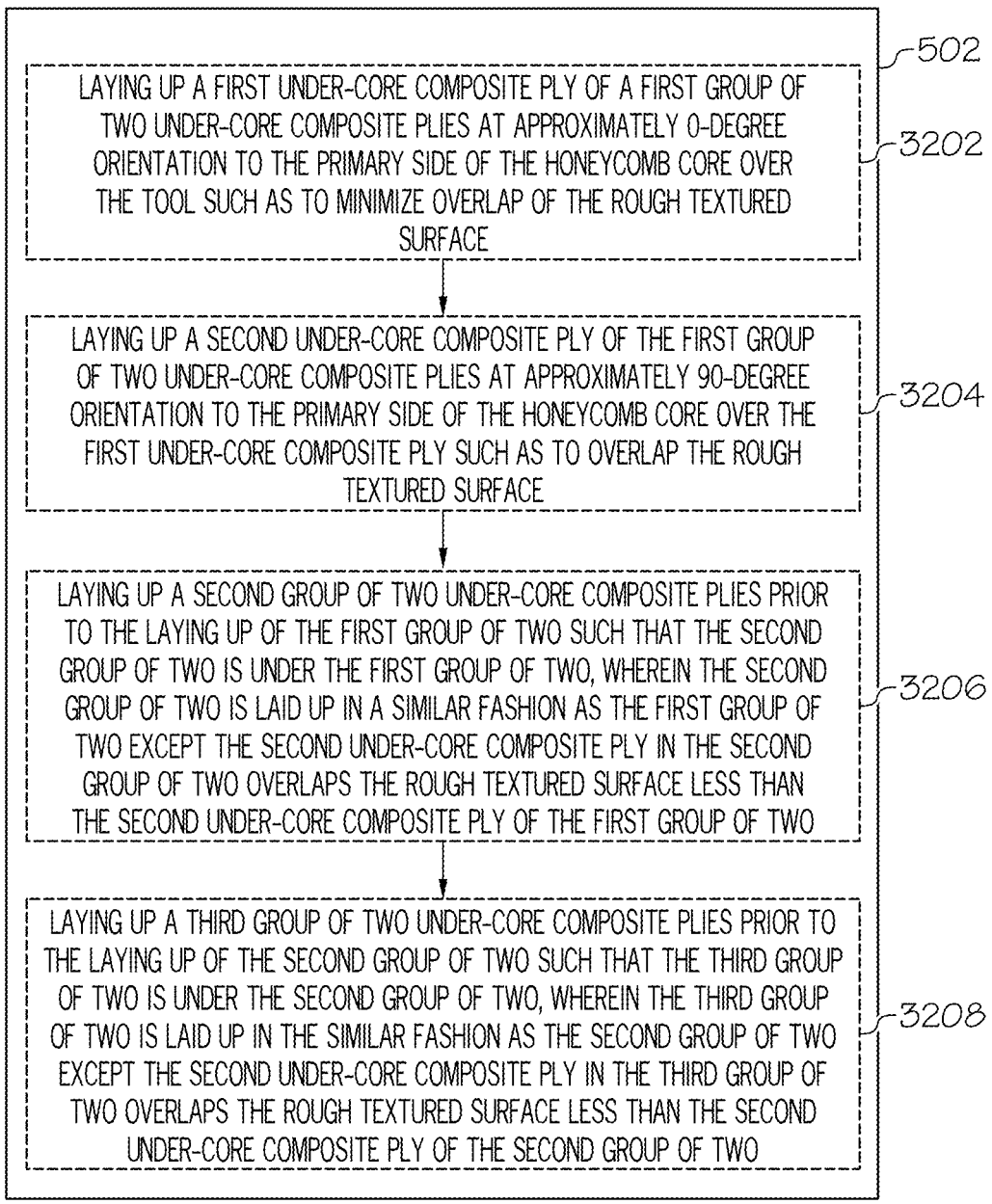
FIG. 32 is a flow diagram of still yet another example of the laying up the first plurality of unidirectional tows of FIG. 5.

In yet another example of the method 1100, the laying up 502 of the first plurality of unidirectional tows 602 includes laying up 3202 (see FIG. 32) a first under-core composite ply 672 of a first group of two 674 under-core composite plies 639 at approximately 0-degree orientation to the primary side 630 of the honeycomb core 606 over the tool 100 such as to minimize overlap of the rough textured surface 102. At 3204, a second under-core composite ply 676 of the first group of two 674 under-core composite plies 639 is laid up at approximately 90-degree orientation to the primary side 630 of the honeycomb core 606 over the first under-core composite ply 672 such as to overlap the rough textured surface 102.

In a further example, the laying up 502 of the first plurality of unidirectional tows 602 also includes laying up 3206 a second group of two 678 under-core composite plies 639 prior to the laying up 3202, 3204 of the first group of two 674 such that the second group of two 678 is under the first group of two 674. The second group of two 678 is laid up in a similar (e.g., same) fashion as the first group of two 674 except the second under-core composite ply 676 in the second group of two 678 overlaps the rough textured surface 102 less than the second under-core composite ply 676 of the first group of two 674.

In an even further example, the laying up 502 of the first plurality of unidirectional tows 602 also includes laying up 3208 a third group of two 680 under-core composite plies 639 prior to the laying up 3206 of the second group of two 678 such that the third group of two 680 is under the second group of two 678. The third group of two 680 is laid up in the similar (e.g., same) fashion as the second group of two 678 except the second under-core composite ply 676 in the third group of two 680 overlaps the rough textured surface 102 less than the second under-core composite ply 676 of the second group of two 678.

In yet another example of the method 1100, the laying up 506 of the second plurality of unidirectional tows 608 includes laying up 1502 (see FIG. 15) a first over-core composite ply 656 of a first group of four 658 over-core composite plies 640 at approximately 90-degree orientation to the primary side 630 of the honeycomb core 606 over the honeycomb core 606 and the first plurality of unidirectional tows 602 such as to approximately overlap the honeycomb core 606 and at least a first portion 114 of the rough textured surface 102. At 1504, a second over-core composite ply 660 of the first group of four 658 over-core composite plies 640 is laid up at approximately −45-degree orientation to the primary side 630 of the honeycomb core 606 over the first over-core composite ply 656 such as to approximately overlap at least a portion of the first over-core composite ply 656 and at least a second portion 116 of the rough textured surface 102. At 1506, a third over-core composite ply 662 of the first group of four 658 over-core composite plies 640 is laid up at approximately 0-degree orientation to the primary side 630 of the honeycomb core 606 over the second over-core composite ply 660 such as to approximately overlap the first over-core composite ply 656 and at least a portion of the second over-core composite ply 660. At 1508, a fourth over-core composite ply 664 of the first group of four 658 over-core composite plies 640 is laid up at approximately 45-degree orientation to the primary side 630 of the honeycomb core 606 over the third over-core composite ply 662 such as to approximately overlap of the second over-core composite ply 660 and at least a portion of the third over-core composite ply 662.

In a further example, the laying up 506 of the second plurality of unidirectional tows 608 also includes laying up 1602 (see FIG. 16) a second group of four 666 over-core composite plies 640 over the first group of four 658 over-core composite plies 640. The second group of four 666 being laid up in a similar (e.g., same) fashion as the first group of four 658. In an even further example, the laying up 506 of the second plurality of unidirectional tows 608 also includes laying up 1702 (see FIG. 17) a third group of four 668 over-core composite plies 640 over the second group of four 666 over-core composite plies 640. The third group of four 668 being laid up in the similar (e.g., same) fashion as the second group of four 666.

Figure 33:
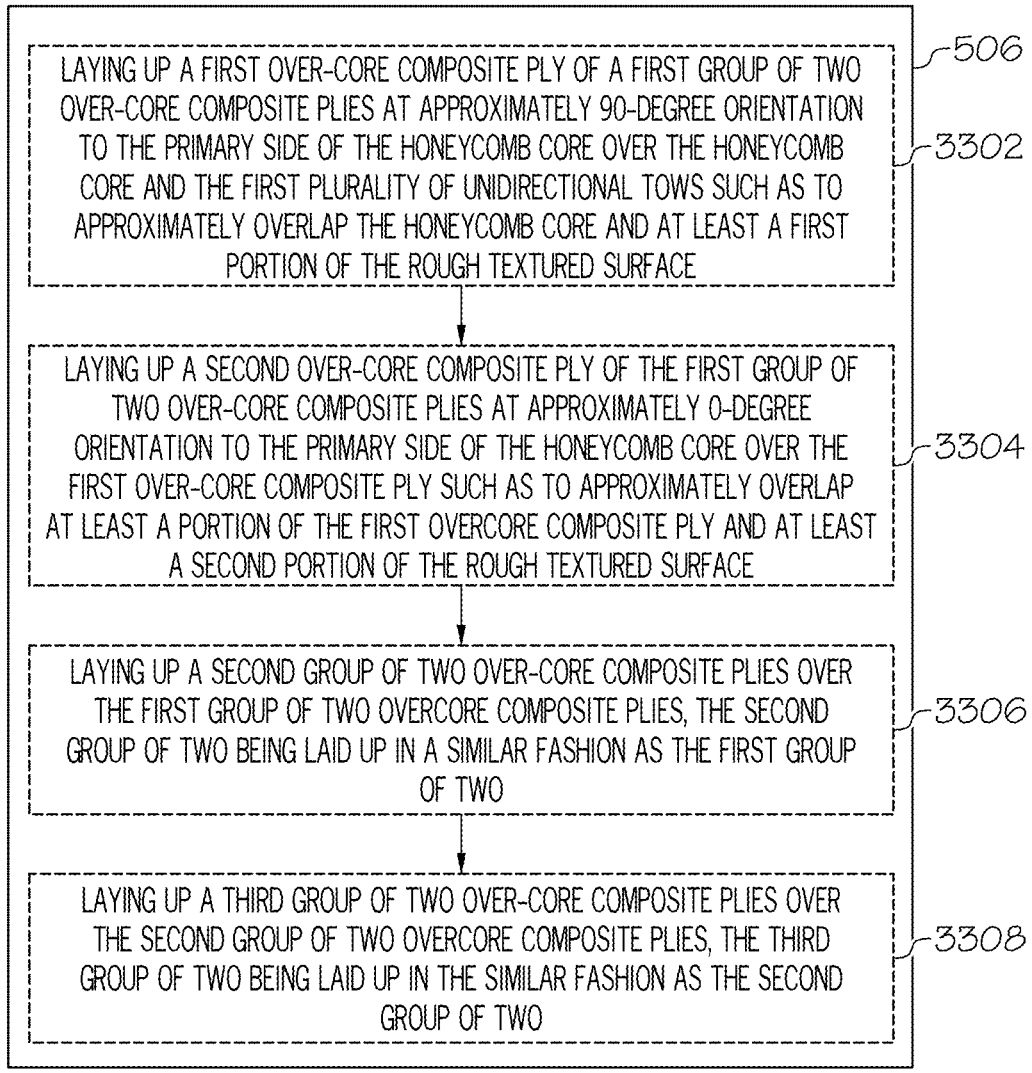
FIG. 33 is a flow diagram of still yet another example of the laying up the second plurality of unidirectional tows of FIG. 5.

In yet another example of the method 1100, the laying up 506 of the second plurality of unidirectional tows 608 includes laying up 3302 (see FIG. 33) a first over-core composite ply 682 of a first group of two 686 over-core composite plies 640 at approximately 90-degree orientation to the primary side 630 of the honeycomb core 606 over the honeycomb core 606 and the first plurality of unidirectional tows 602 such as to approximately overlap the honeycomb core 606 and at least a first portion 114 of the rough textured surface 102. At 3304, a second over-core composite ply 684 of the first group of two 686 over-core composite plies 640 is laid up at approximately 0-degree orientation to the primary side 630 of the honeycomb core 606 over the first over-core composite ply 682 such as to approximately overlap at least a portion of the first over-core composite ply 682 and at least a second portion 116 of the rough textured surface 102. In a further example, the laying up 506 of the second plurality of unidirectional tows 608 also includes laying up 3306 a second group of two 688 over-core composite plies 640 over the first group of two 686 over-core composite plies 640. The second group of two 688 being laid up in a similar (e.g., same) fashion as the first group of two 686. In an even further example, the laying up 506 of the second plurality of unidirectional tows 608 also includes laying up 3308 a third group of two 690 over-core composite plies 640 over the second group of two 688 over-core composite plies 640. The third group of two 690 being laid up in the similar (e.g., same) fashion as the second group of two 688.

With reference again to FIGS. 1, 5, 6, 11, 18 and 21, in one or more examples, a method 1800 (see FIG. 18) for fabrication of a layup 600 for a composite honeycomb core sandwich structure 2100 includes the method 500 of FIG. 5. In the method 1800, the three-dimensional body 622 of the honeycomb core 606 includes at least four sides 626 chamfered from the top surface 624 toward the bottom surface 620. The method 1800 includes analyzing 1802 the honeycomb core 606 to determine risks of the at least four sides 626 crushing during autoclave cure of the composite honeycomb core sandwich structure 2100. At 1804, it is determined that the at least four sides 626 include two pairs of opposing sides 626 with a first pair having a steeper chamfer angle than a second pair. At 1806, the first pair is selected from the at least four sides 626 as having a higher risk of crushing over the second pair. At 1808, the primary side 630 is selected from the first pair over an opposing side as having a highest risk of crushing among the at least four sides 626. The method 1800 continues from 1808 to 502 of FIG. 5.

With reference again to FIGS. 1, 5, 6, 11, 19 and 21, in one or more examples, a method 1900 (see FIG. 19) for fabrication of a layup 600 for a composite honeycomb core sandwich structure 2100 includes the method 500 of FIG. 5. In the method 1900, the three-dimensional body 622 of the honeycomb core 606 includes at least six sides 626 chamfered from the top surface 624 toward the bottom surface 620. The method 1900 includes analyzing 1902 the honeycomb core 606 to determine risks of the at least six sides 626 crushing during autoclave cure of the composite honeycomb core sandwich structure 2100. At 1904, it is determined that the at least six sides 626 include three pairs of opposing sides 626 with a first pair having a longer length than a second pair and a third pair. At 1906, the first pair is selected from the at least six sides 626 as having a higher risk of crushing over the second pair and the third pair. At 1908, the primary side 630 is selected from the first pair over an opposing side as having a highest risk of crushing among the at least six sides 626. The method 1900 continues from 1908 to 502 of FIG. 5.

With reference again to FIGS. 1, 5, 6, 20 and 21, in one or more examples, a method 2000 (see FIG. 20) for fabrication of a layup 600 for a composite honeycomb core sandwich structure 2100 includes the method 500 of FIG. 5. In the method 2000, the three-dimensional body 622 of the honeycomb core 606 includes at least eight sides 626 chamfered from the top surface 624 toward the bottom surface 620. The method 2000 includes analyzing 2002 the honeycomb core 606 to determine risks of the at least eight sides 626 crushing during autoclave cure of the composite honeycomb core sandwich structure 2100. At 2004, it is determined that the at least eight sides 626 include four pairs of opposing sides 626 with a first pair having at least one of a steeper chamfer angle than a second pair, a third pair and a fourth pair and having a longer length than the second pair, the third pair and the fourth pair. At 2006, the first pair is selected from the at least eight sides 626 as having a higher risk of crushing over the second pair, the third pair and the fourth pair. At 2008, the primary side 630 is selected from the first pair over an opposing side as having a highest risk of crushing among the at least eight sides 626. The method 2000 continues from 2008 to 502 of FIG. 5.

Figure 34:
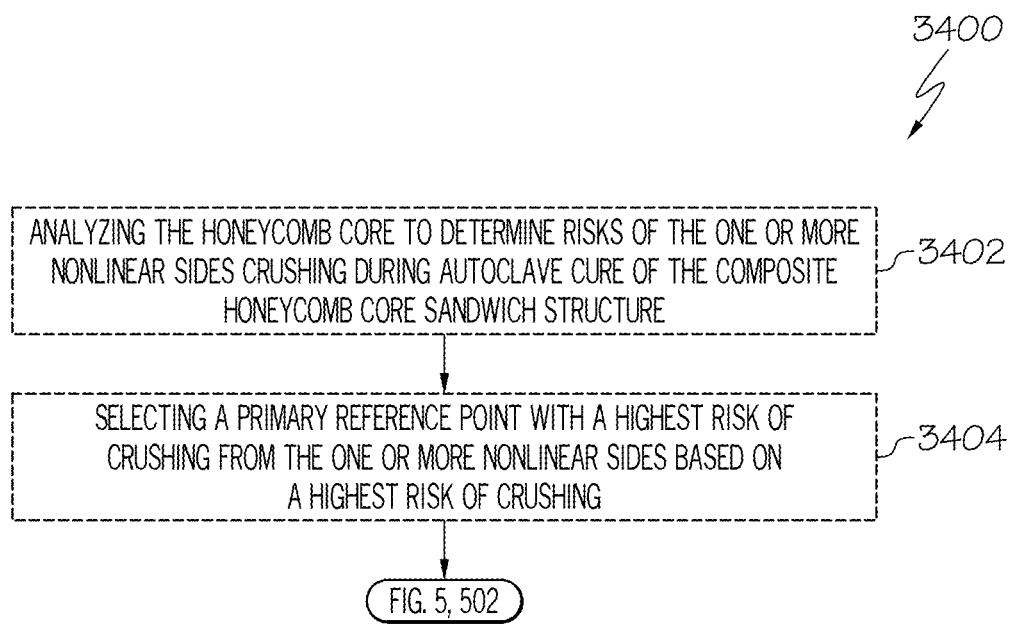
FIG. 34, in combination with FIG. 5, is a flow diagram of another example of a method for fabrication of a layup for a composite honeycomb core sandwich structure.

With reference again to FIGS. 1, 5, 6, 21 and 34, in one or more examples, a method 3400 (see FIG. 34) for fabrication of a layup 600 for a composite honeycomb core sandwich structure 2100 includes the method 500 of FIG. 5. In the method 3400, the honeycomb core 606 includes a three-dimensional body 622 with a top surface 624, a bottom surface 620 and one or more nonlinear sides 626 chamfered from the top surface 624 toward the bottom surface 620. The method 3400 includes analyzing 3402 the honeycomb core 606 to determine risks the one or more nonlinear sides 626 crushing during autoclave cure of the composite honeycomb core sandwich structure 2100. At 3404, a primary reference point 692 is selected along the one or more nonlinear sides 626 based on a highest risk of crushing. The method 3400 continues from 3404 to 502 of FIG. 5.

With reference again to FIGS. 1, 5, 6, 21 and 31, in one or more examples, a method 3100 (see FIG. 31) for fabrication of a layup 600 for a composite honeycomb core sandwich structure 2100 includes the method 500 of FIG. 5. The method 3100 continues from 506 of FIG. 5 to 3102 where the stack of under-core composite plies 604, the honeycomb core 606 and the stack of over-core composite plies 610 is sealed on the tool 100 with a compaction bag 112. At 3104, a vacuum is pulled on the tool 100. At 3106, the composite honeycomb core sandwich structure 2100 is cured in an autoclave. At 3108, the vacuum is released. At 3110, the compaction bag 112 is unsealed. At 3112, the compaction bag 112 is moved off the composite honeycomb core sandwich structure 2100. At 3114, excess portions of the stack of under-core composite plies 604 and the stack of over-core composite plies 610 are cut along a trimline for the composite honeycomb core sandwich structure 2100. At 3116, the composite honeycomb core sandwich structure 2100 is removed from the tool 100. Alternatively, at 3118, the composite honeycomb core sandwich structure 2100 may be removed from the tool 100. Then, at 3120, excess portions of the stack of under-core composite plies 604 and the stack of over-core composite plies 610 are cut along a trimline for the composite honeycomb core sandwich structure 2100.

Referring generally to FIGS. 1, 4, 6 and 21, by way of examples, the present disclosure is directed to a composite honeycomb core sandwich structure 2100. FIG. 1 provides a top view of an example of a tool 100 for layup 600 of a composite honeycomb core sandwich structure 2100. FIG. 4 provides an example of a layup 600 of a stack of under-core composite plies 604 on the tool 100 of FIG. 1. FIG. 6 is an exploded view of an example of a layup 600 for a composite honeycomb core sandwich structure 2100 on the tool 100 of FIG. 1. FIG. 21 provides an example of the composite honeycomb core sandwich structure 2100.

With reference again to FIGS. 1, 4, 6 and 21, in one or more examples, a composite honeycomb core sandwich structure 2100 (see FIG. 21) includes a stack of under-core composite plies 604, a honeycomb core 606 and a stack of over-core composite plies 610. The stack of under-core composite plies 604 were laid up over a tool 100 using an automated fiber placement process to lay up a first plurality of unidirectional tows 602. The honeycomb core 606 was placed on the stack of under-core composite plies 604. The stack of over-core composite plies 610 were laid up over the honeycomb core 606 using the automated fiber placement process to lay up a second plurality of unidirectional tows 608.

In another example of the composite honeycomb core sandwich structure 2100, each unidirectional tow 614 includes unidirectional reinforcement fibers impregnated with a polymer resin to form a composite unidirectional tape 402. In a further example, the unidirectional reinforcement fibers include carbon fibers, glass fibers, polyaramid fibers, acrylic fibers, viscose rayon fibers or any other suitable reinforcement fibers in any suitable combination. In yet another example of the composite honeycomb core sandwich structure 2100, orientations of the stack of under-core composite plies 604 are quasi-isotropic. In still another example of the composite honeycomb core sandwich structure 2100, orientations of the stack of over-core composite plies 610 are quasi-isotropic. In still yet another example of the composite honeycomb core sandwich structure 2100, orientations of the stack of over-core composite plies 610 are symmetrical to orientations of the stack of under-core composite plies 604 in relation to the honeycomb core 606.

In another example, the composite honeycomb core sandwich structure 2100 also includes a composite woven fabric sheet 616 under the stack of under-core composite plies 604. In a further example, the composite woven fabric sheet 616 is impregnated with a polymer resin and includes a fiberglass sheet, a carbon fiber sheet, a polyaramid sheet or any other suitable composite woven fabric sheet in any suitable combination. In yet another example, the composite honeycomb core sandwich structure 2100 also includes an under-core film adhesive 618 between the stack of under-core composite plies 604 and the honeycomb core 606. In a further example, the under-core film adhesive 618 includes an epoxy film adhesive, a polyurethane film adhesive, a polyimide film adhesive or any other suitable adhesive in any suitable combination.

In still another example of the composite honeycomb core sandwich structure 2100, the honeycomb core 606 includes multiple segments 2102. In a further example, the multiple segments 2102 of the honeycomb core 606 include a forward segment 2104, a center segment 2106 and an aft segment 2108. In still yet another example of the composite honeycomb core sandwich structure 2100, the honeycomb core 606 includes a non-metallic material, a flame-resistant meta-aramid material, an aramid paper material, a fiberglass material, a metallic material, an aluminum material or any other suitable material in any suitable combination. In another example, the composite honeycomb core sandwich structure 2100 also includes an over-core film adhesive 628 between the honeycomb core 606 and the stack of over-core composite plies 610. In a further example, the over-core film adhesive 628 includes an epoxy film adhesive, a polyurethane film adhesive, a polyimide film adhesive or any other suitable adhesive in any suitable combination.

In yet another example of the composite honeycomb core sandwich structure 2100, the honeycomb core 606 includes a three-dimensional body 622 with a top surface 624, a bottom surface 620 and at least three sides 626 chamfered from the top surface 624 toward the bottom surface 620. In this example, during fabrication of the composite honeycomb core sandwich structure 2100, a primary side 630 of the at least three sides 626 was deemed to have a highest risk of crushing during autoclave cure. In a further example, the primary side 630 was selected based at least in part on the primary side 630 having a steepest chamfer of the at least three sides 626. In another further example, the primary side 630 was selected based at least in part on the primary side 630 being a longest side of the at least three sides 626.

In yet another further example, a last composite ply 632 in the stack of under-core composite plies 604 is closest to the honeycomb core 606 and is oriented perpendicular to the primary side 630. In a further example, each group of four 634 under-core composite plies 639 in the stack of under-core composite plies 604 are oriented in quasi-isotropic fashion based on orientation of the last composite ply 632 being perpendicular to the primary side 630. In still another further example, a first composite ply 636 in the stack of over-core composite plies 610 is closest to the honeycomb core 606 and is oriented perpendicular to the primary side 630. In a further example, each group of four 638 over-core composite plies 640 in the stack of over-core composite plies 610 are oriented in quasi-isotropic fashion based on orientation of the first composite ply 636 being perpendicular to the primary side 630.

Figure 24:
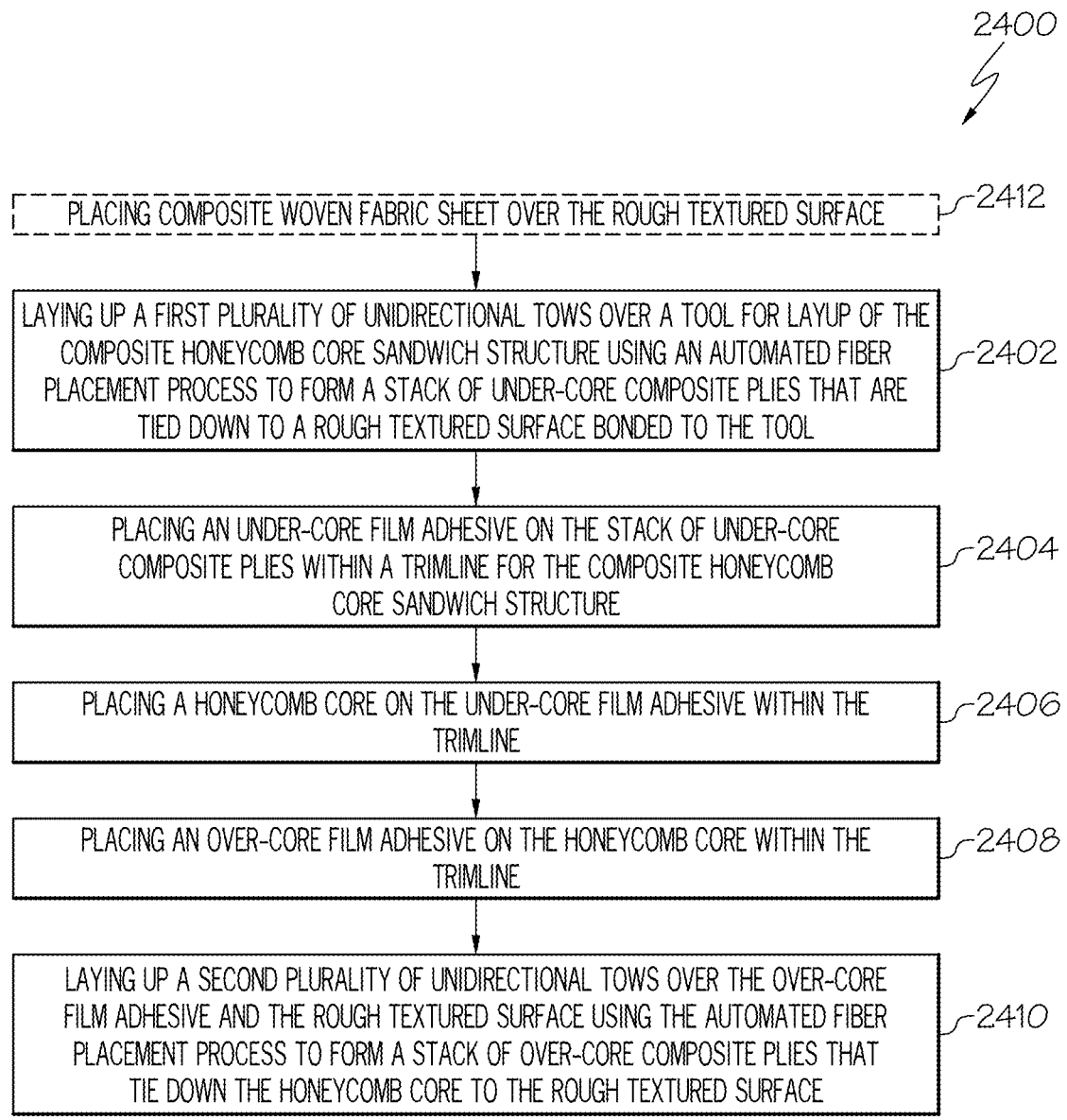
FIG. 24 is a flow diagram of another example of a method for fabrication of a layup for a composite honeycomb core sandwich structure.
Figure 25:
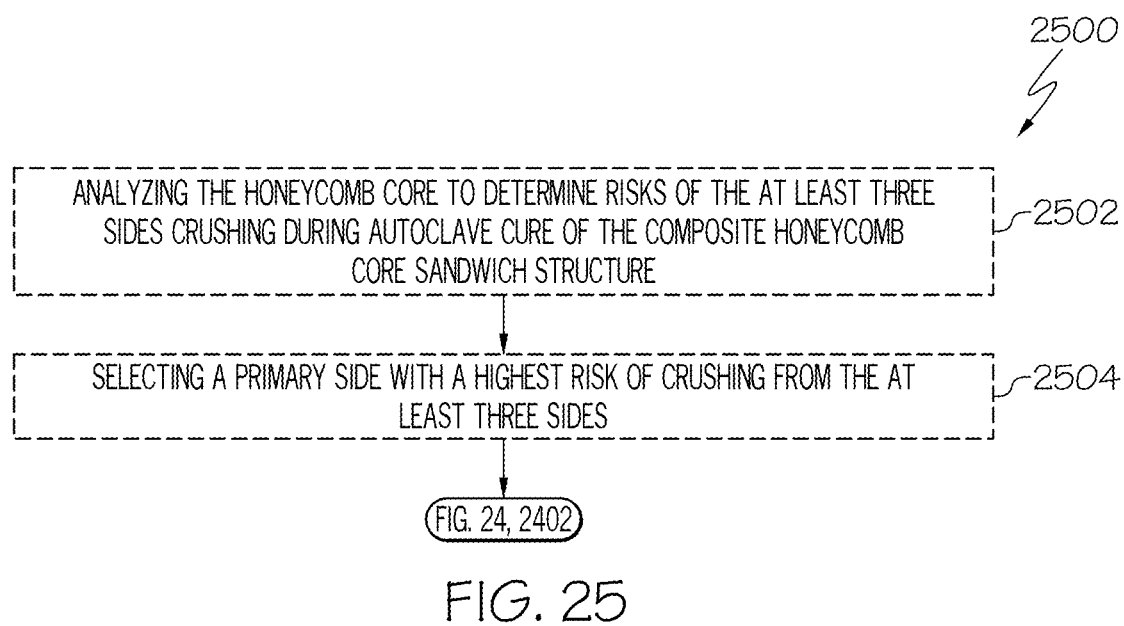
FIG. 25, in combination with FIG. 24, is a flow diagram of yet another example of a method for fabrication of a layup for a composite honeycomb core sandwich structure.
Figure 26:
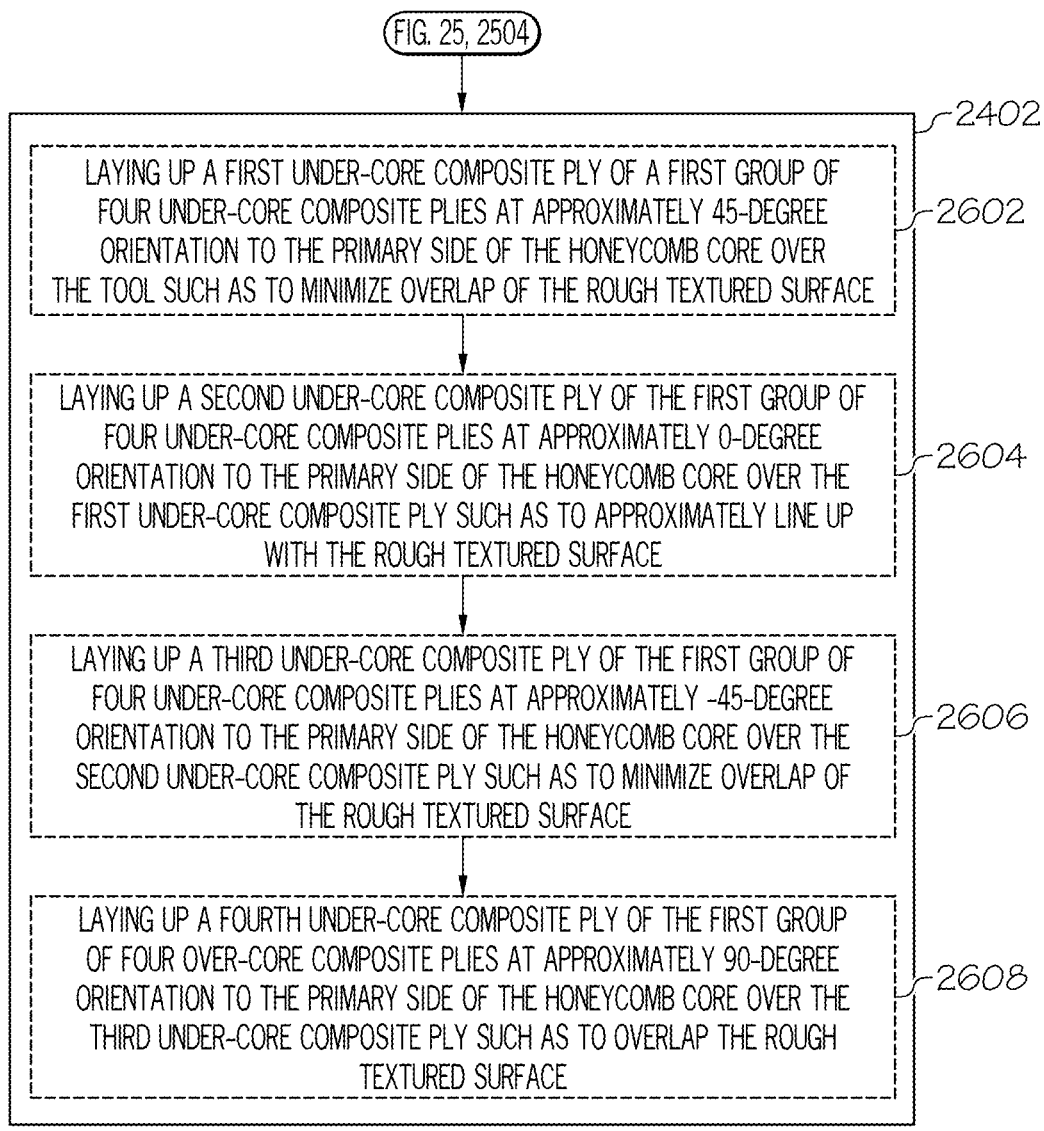
FIG. 26 is a flow diagram of an example of the laying up the first plurality of unidirectional tows of FIG. 24.
Figure 27:
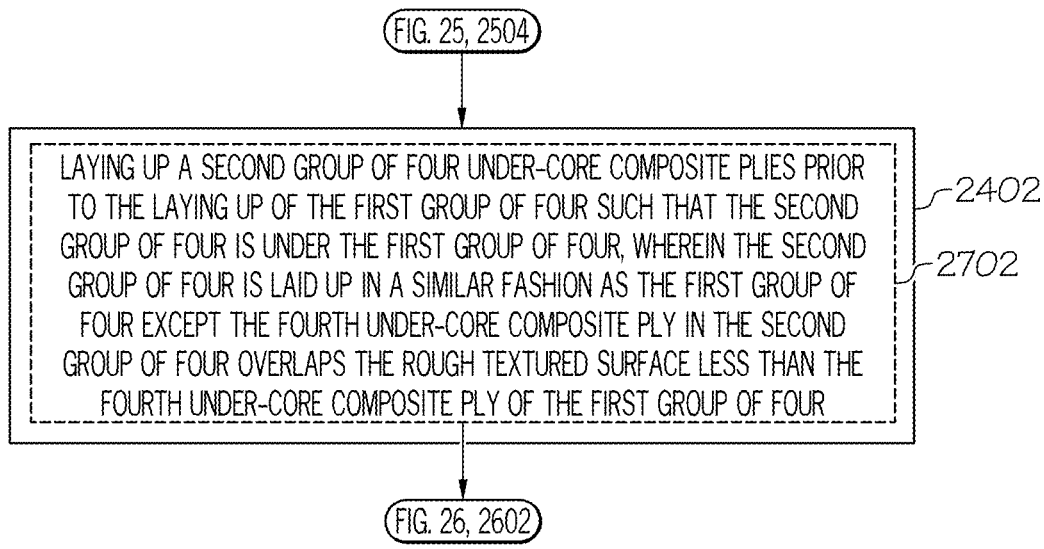
FIG. 27, in combination with FIG. 26, is a flow diagram of another example the laying up the first plurality of unidirectional tows of FIG. 24.
Figure 28:
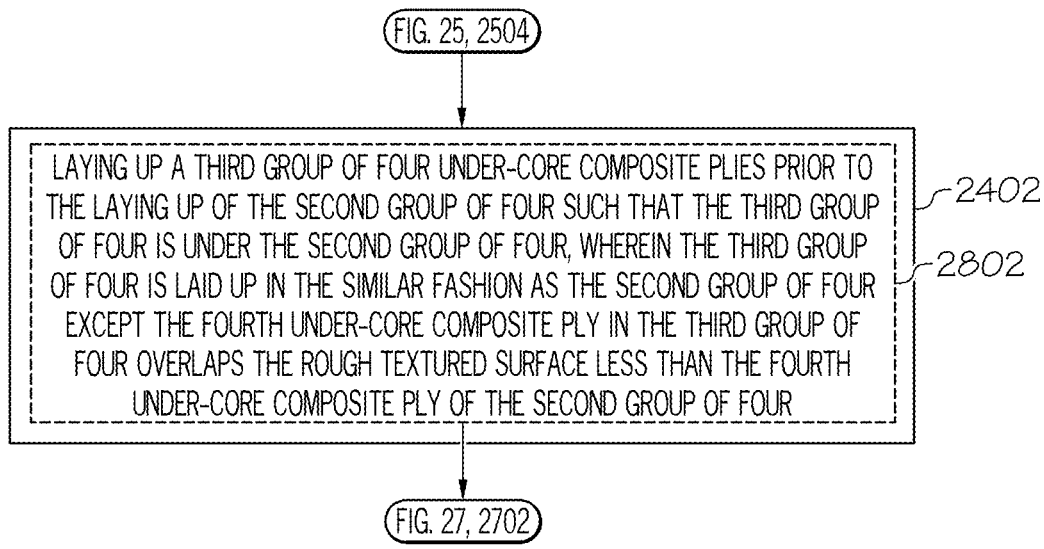
FIG. 28, in combination with FIG. 26 and FIG. 27, is a flow diagram of yet another example the laying up the first plurality of unidirectional tows of FIG. 24.
Figure 29A:
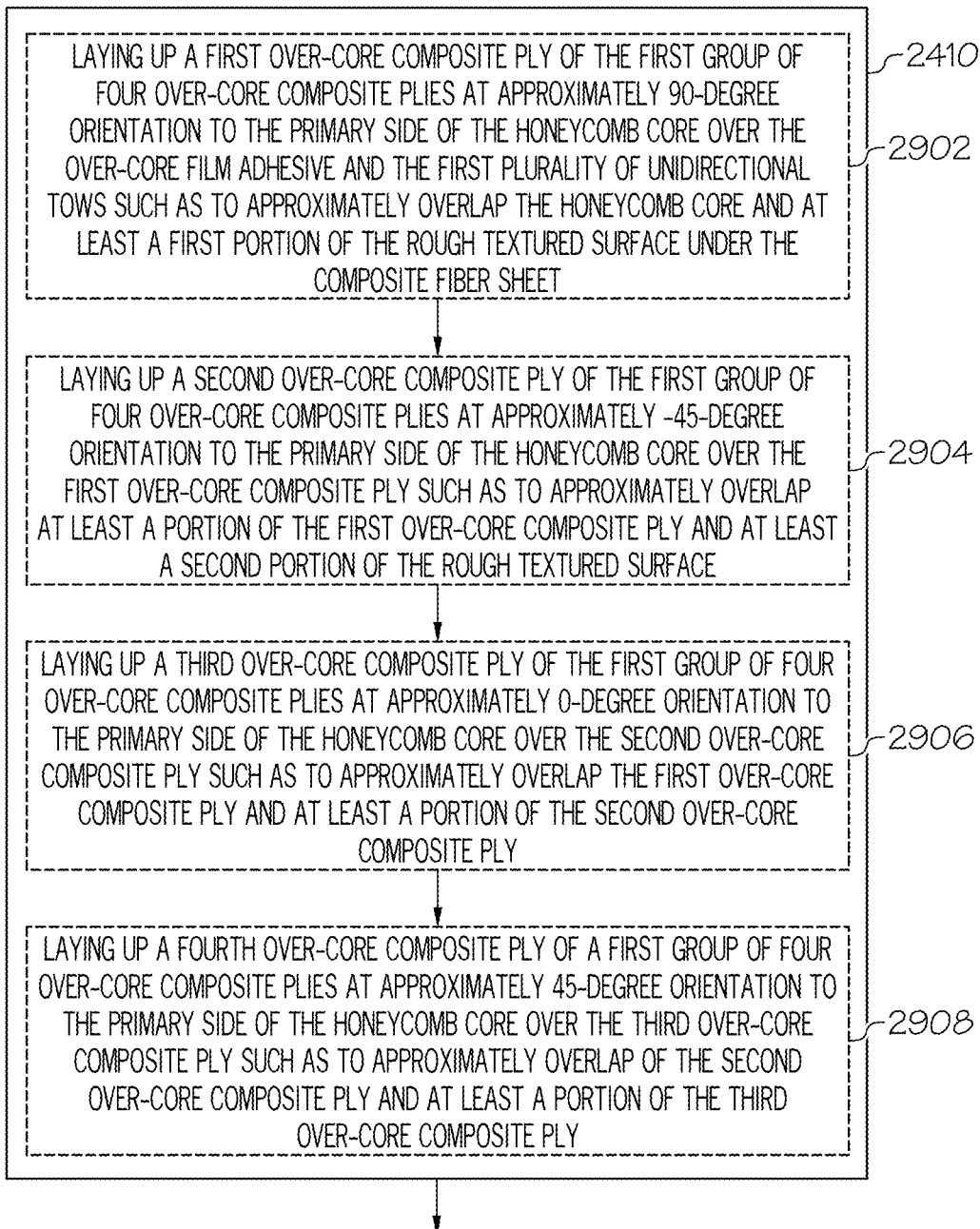
Figure 29B:
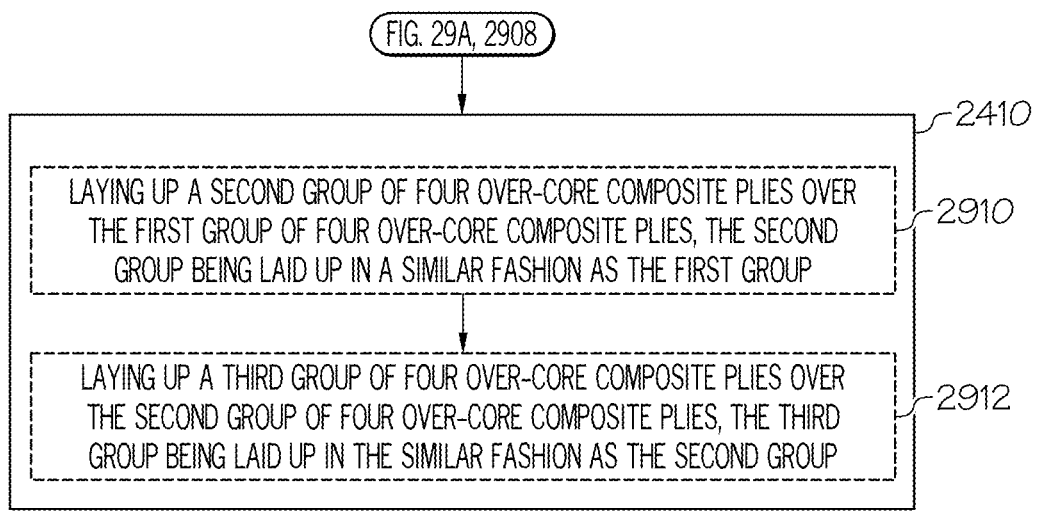
Figure 30:
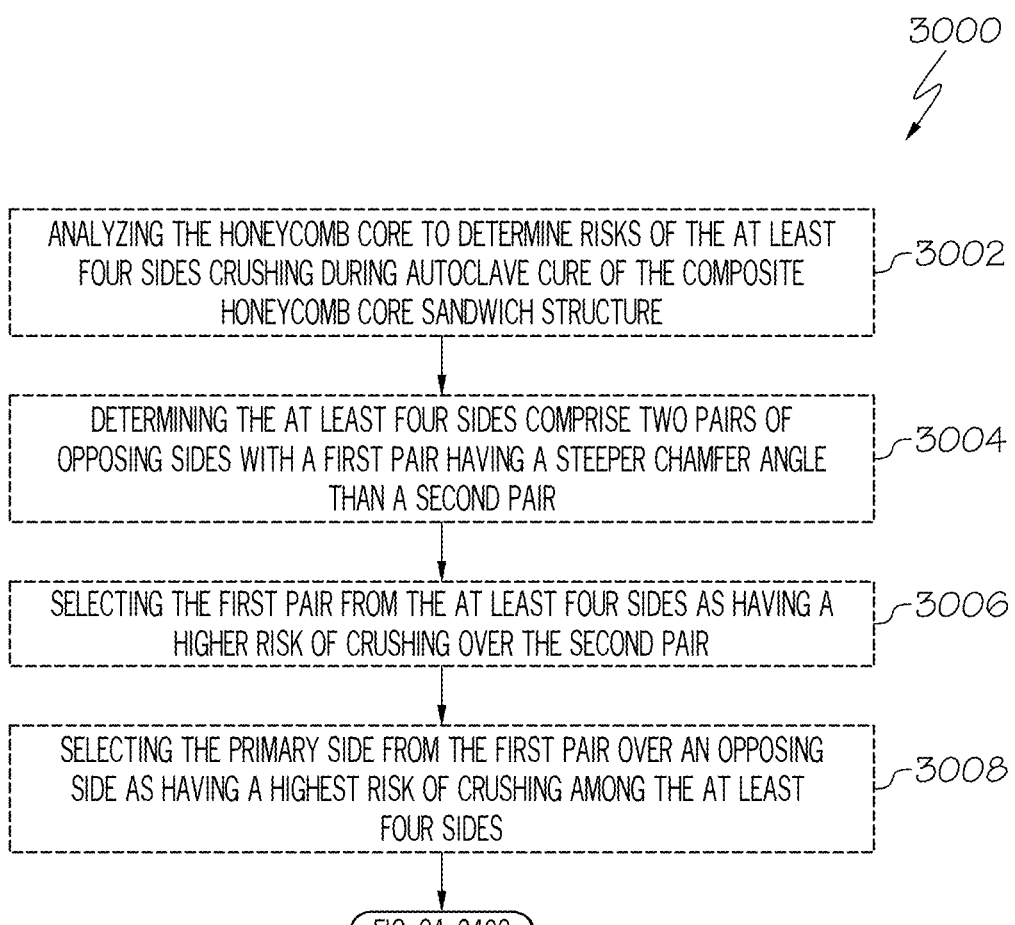
FIG. 30, in combination with FIG. 24, is a flow diagram of still another example of a method for fabrication of a layup for a composite honeycomb core sandwich structure.

Referring generally to FIGS. 1, 6, 21 and 24-30, by way of examples, the present disclosure is directed to a method 2400, 2500, 3000 for fabrication of a layup 600 for a composite honeycomb core sandwich structure 2100. FIG. 1 provides a top view of an example of a tool 100 for layup 600 of a composite honeycomb core sandwich structure 2100. FIG. 6 is an exploded view of an example of the layup 600 for a composite honeycomb core sandwich structure 2100 on the tool 100 of FIG. 1. FIG. 21 provides an example of a composite honeycomb core sandwich structure 2100. FIG. 24 provides an example of the method 2400 for fabrication of a layup 600 for a composite honeycomb core sandwich structure 2100. FIG. 25, in combination with FIG. 24, provides an example of the method 2500 for fabrication of a layup 600 for a composite honeycomb core sandwich structure 2100. FIG. 26 provides an example of the laying up 2402 of the first plurality of unidirectional tows 602 of FIG. 24. FIG. 27, in combination with FIG. 26, provides another example of the laying up 2402 of the first plurality of unidirectional tows 602 of FIG. 24. FIG. 28, in combination with FIG. 26 and FIG. 27, provides yet another example of the laying up 2402 of the first plurality of unidirectional tows 602 of FIG. 24. FIGS. 29A-B provide an example of the laying up 2410 of the second plurality of unidirectional tows 608 of FIG. 24. FIG. 30, in combination with FIG. 24, provides an example of the method 3000 for fabrication of a layup 600 for a composite honeycomb core sandwich structure 2100.

With reference again to FIGS. 1, 6, 21 and 24, in one or more examples, a method 2400 (see FIG. 24) for fabrication of a layup 600 for a composite honeycomb core sandwich structure 2100 includes laying up 2402 a first plurality of unidirectional tows 602 over a tool 100 for layup 600 of the composite honeycomb core sandwich structure 2100 using an automated fiber placement process to form a stack of under-core composite plies 604 that are tied down to a rough textured surface 102 bonded to the tool 100. At 2404, an under-core film adhesive 618 is placed on the stack of under-core composite plies 604 within a trimline 612 for the composite honeycomb core sandwich structure 2100. At 2406, a honeycomb core 606 is placed on the under-core film adhesive 618 within the trimline 612. At 2408, an over-core film adhesive 628 is placed on the honeycomb core 606 within the trimline 612. At 2410, a second plurality of unidirectional tows 608 is laid up over the over-core film adhesive 628 and the rough textured surface 102 using the automated fiber placement process to form a stack of over-core composite plies 610 that tie down the honeycomb core 606 to the rough textured surface 102. In another example, the method 2400 also includes placing 2412 a composite woven fabric sheet 616 over the rough textured surface 102.

With reference again to FIGS. 1, 6, 21 and 24-29, in one or more examples, a method 2500 (see FIG. 25) for fabrication of a layup 600 for a composite honeycomb core sandwich structure 2100 includes the method 2400 of FIG. 24. In the method 2500, the honeycomb core 606 includes a three-dimensional body 622 with a top surface 624, a bottom surface 620 and at least three sides 626 chamfered from the top surface 624 toward the bottom surface 620. The method 2500 includes analyzing 2502 the honeycomb core 606 to determine risks of the at least three sides 626 crushing during autoclave cure of the composite honeycomb core sandwich structure 2100. At 2504, a primary side 630 is selected from the at least three sides 626 with a highest risk of crushing.

In another example of the method 2500, the laying up 2402 of the first plurality of unidirectional tows 602 includes laying up 2602 (see FIG. 26) a first under-core composite ply 642 of a first group of four 644 under-core composite plies 639 at approximately 45-degree orientation to the primary side 630 of the honeycomb core 606 over the tool 100 such as to minimize overlap of the rough textured surface 102. At 2604, a second under-core composite ply 646 of the first group of four 644 under-core composite plies 639 is laid up at approximately 0-degree orientation to the primary side 630 of the honeycomb core 606 over the first under-core composite ply 642 such as to approximately line up with the rough textured surface 102. At 2606, a third under-core composite ply 648 of the first group of four 644 under-core composite plies 639 is laid up at approximately −45-degree orientation to the primary side 630 of the honeycomb core 606 over the second under-core composite ply 646 such as to minimize overlap of the rough textured surface 102. At 2608, a fourth under-core composite ply 650 of the first group of four 644 over-core composite plies 640 at approximately 90-degree orientation to the primary side 630 of the honeycomb core 606 over the third under-core composite ply 648 such as to overlap the rough textured surface 102.

In a further example, the laying up 2402 of the first plurality of unidirectional tows 602 also includes laying up 2702 (see FIG. 27) a second group of four 652 under-core composite plies 639 prior to the laying up 2602, 2604, 2606, 2608 of the first group of four 644 such that the second group of four 652 is under the first group of four 644. The second group of four 652 is laid up in a similar (e.g., same) fashion as the first group of four 644 except the fourth under-core composite ply 650 in the second group of four 652 overlaps the rough textured surface 102 less than the fourth under-core composite ply 650 of the first group of four 644.

In an even further example, the laying up 2402 of the first plurality of unidirectional tows 602 also includes laying up 2802 (see FIG. 28) a third group of four 654 under-core composite plies 639 prior to the laying up 2702 of the second group of four 652 such that the third group of four 654 is under the second group of four 652. The third group of four 654 is laid up in the similar (e.g., same) fashion as the second group of four 652 except the fourth under-core composite ply 650 in the third group of four 654 overlaps the rough textured surface 102 less than the fourth under-core composite ply 650 of the second group of four 652.

In yet another example of the method 2500, the laying up 2410 of the second plurality of unidirectional tows 608 includes laying up 2902 (see FIGS. 29A-B) a first over-core composite ply 656 of a first group of four 658 over-core composite plies 640 at approximately 90-degree orientation to the primary side 630 of the honeycomb core 606 over the over-core film adhesive 628 and the first plurality of unidirectional tows 602 such as to approximately overlap the honeycomb core 606 and at least a first portion of the rough textured surface 102. At 2904, a second over-core composite ply 660 of the first group of four 658 over-core composite plies 640 at approximately −45-degree orientation to the primary side 630 of the honeycomb core 606 over the first over-core composite ply 656 such as to approximately overlap at least a portion of the first over-core composite ply 656 and at least a second portion 116 of the rough textured surface 102. At 2906, a third over-core composite ply 662 of the first group of four 658 over-core composite plies 640 is laid up at approximately 0-degree orientation to the primary side 630 of the honeycomb core 606 over the second over-core composite ply 660 such as to approximately overlap the first over-core composite ply 656 and at least a portion of the second over-core composite ply 660. At 2908, a fourth over-core composite ply 664 of the first group of four 658 over-core composite plies 640 is laid up at approximately 45-degree orientation to the primary side 630 of the honeycomb core 606 over the third over-core composite ply 662 such as to approximately overlap of the second over-core composite ply 660 and at least a portion of the third over-core composite ply 662. At 2910, a second group of four 666 over-core composite plies 640 is laid up over the first group of four 658 over-core composite plies 640. The second group of four 666 being laid up in a similar (e.g., same) fashion as the first group of four 658. At 2912, a third group of four 668 over-core composite plies 640 is laid up over the second group of four 666 over-core composite plies 640. The third group of four 668 being laid up in the similar (e.g., same) fashion as the second group of four 666.

With reference again to FIGS. 1, 6, 21, 24 and 30, in one or more examples, a method 3000 (see FIG. 30) for fabrication of a layup 600 for a composite honeycomb core sandwich structure 2100 includes the method 2400 of FIG. 24. In the method 3000, the three-dimensional body 622 of the honeycomb core 606 includes at least four sides 626 chamfered from the top surface 624 toward the bottom surface 620. The method 3000 includes analyzing 3002 the honeycomb core 606 to determine risks of the at least four sides 626 crushing during autoclave cure of the composite honeycomb core sandwich structure 2100. At 3004, it is determined that the at least four sides 626 include two pairs of opposing sides 626 with a first pair having a steeper chamfer angle than a second pair. At 3006, the first pair is selected from the at least four sides 626 as having a higher risk of crushing over the second pair. At 3008, the primary side 630 is selected from the first pair over an opposing side as having a highest risk of crushing among the at least four sides 626.

Examples of methods 500, 1100, 1800, 1900, 2000, 2400, 2500, 3000, 3100, 3400 for fabrication of a layup 600 for a composite honeycomb core sandwich structure 2100 and said composite honeycomb core sandwich structure 2100 may be related to or used in the context of aircraft design and manufacture. Although an aircraft example is described, the examples and principles disclosed herein may be applied to other products in the aerospace industry and other industries, such as the automotive industry, the space industry, the construction industry and other design and manufacturing industries. Accordingly, in addition to aircraft, the examples and principles disclosed herein may apply to methods for design and manufacture of various types of vehicles and in the design and construction of various types of transportation structures.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, control system, device, computing device, processor, structure, article, element, component, or hardware "configured to" perform a specified function is indeed capable of performing the specified function without any alteration, rather than merely having potential to perform the specified function after further modification. In other words, the system, apparatus, device, control system, computing device, processor, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, control system, device, computing device, processor, structure, article, element, component, or hardware that enable the system, apparatus, control system, device, computing device, processor, structure, article, element, component, or hardware to perform the specified function without further modification. For purposes of this disclosure, a system, apparatus, device, control system, device, computing device, processor, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

As used herein, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

In FIGS. 5, 7-20, 24-28, 29A-B, 30 and 31, referred to above, the blocks may represent operations, steps, and/or portions thereof, and lines connecting the various blocks do not imply any particular order or dependency of the operations or portions thereof. It will be understood that not all dependencies among the various disclosed operations are necessarily represented. 5, 7-20, 24-28, 29A-B, 30 and 31 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

FIGS. 1-4, 6 and 21-23, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-4, 6 and 21-23, referred to above, need be included in every example and not all elements, features, and/or components described herein are necessarily depicted in each illustrative example. Accordingly, some of the elements, features, and/or components described and illustrated in FIGS. 1-4, 6 and 21-23 may be combined in various ways without the need to include other features described and illustrated in FIGS. 1-4, 6 and 21-23, other drawing figures, and/or the accompanying disclosure, even though such combination or combinations are not explicitly illustrated herein. Similarly, additional features not limited to the examples presented, may be combined with some or all the features shown and described herein. Unless otherwise explicitly stated, the schematic illustrations of the examples depicted in FIGS. 1-4, 6 and 21-23, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-4, 6 and 21-23, and such elements, features, and/or components may not be discussed in detail herein with reference to each of FIGS. 1-4, 6 and 21-23. Similarly, all elements, features, and/or components may not be labeled in each of FIGS. 1-4, 6 and 21-23, but reference numerals associated therewith may be utilized herein for consistency.

Further, references throughout the present specification to features, advantages, or similar language used herein do not imply that all the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but does not necessarily, refer to the same example.

Figure 35:
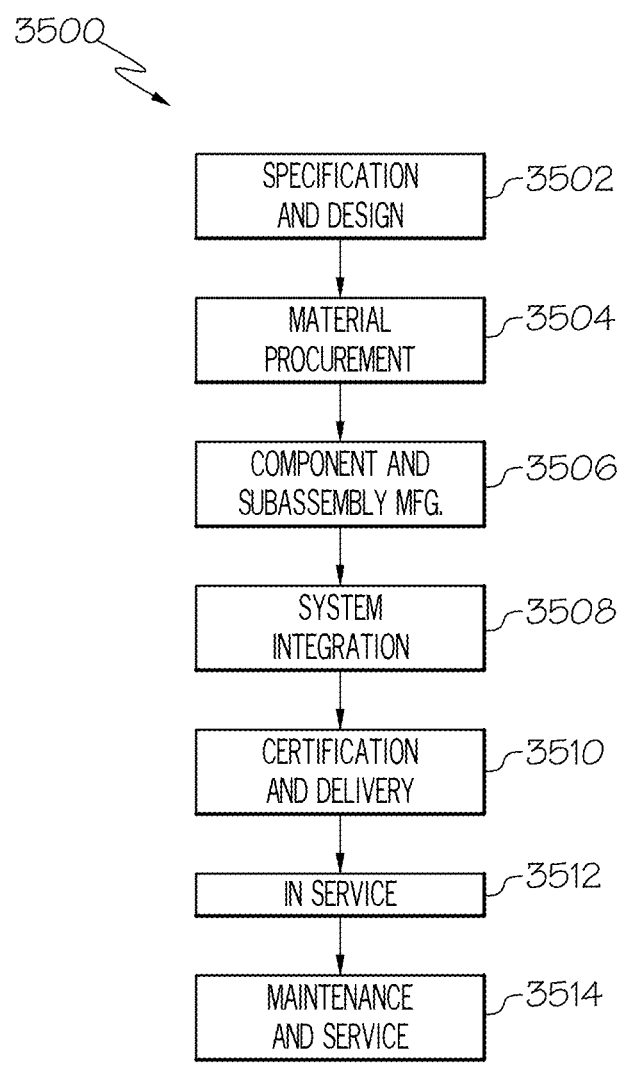
FIG. 35 is a block diagram of aircraft production and service methodology that implements one or more of the examples of methods for fabrication of a layup for a composite honeycomb core sandwich structure disclosed herein.
Figure 36:
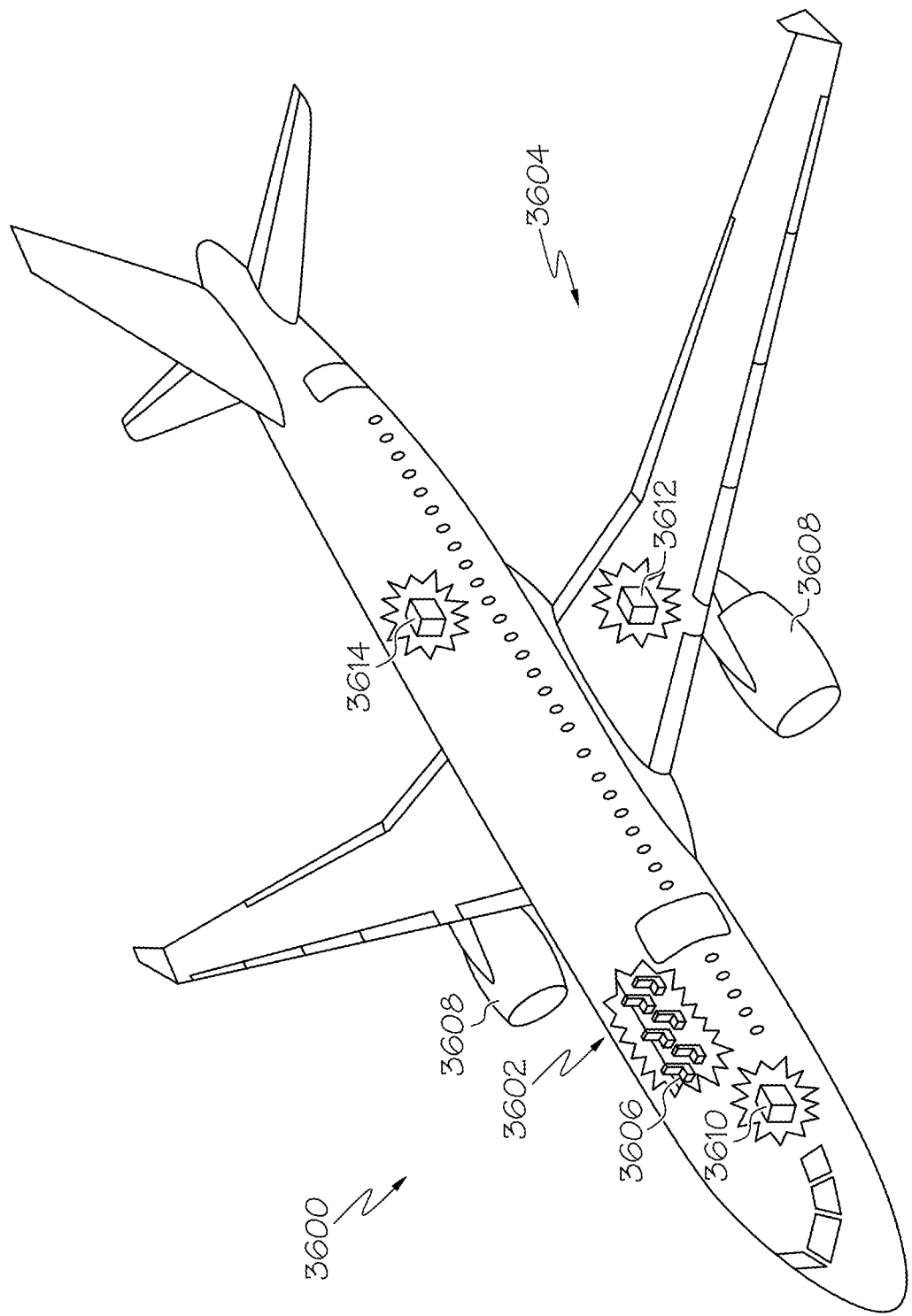
FIG. 36 is a schematic illustration of an aircraft that incorporates one or more of the composite honeycomb core sandwich structure disclosed herein.

Examples of the subject matter disclosed herein may be described in the context of aircraft manufacturing and service method 3500 as shown in FIG. 35 and aircraft 3600 as shown in FIG. 36. In one or more examples, the disclosed methods 500, 1100, 1800, 1900, 2000, 2400, 2500, 3000, 3100, 3400 for fabrication of layups 600 for composite honeycomb core sandwich structures 2100 and said composite honeycomb core sandwich structures 2100 may be used in aircraft manufacturing. During pre-production, the service method 3500 may include specification and design (block 3502) of aircraft 3600 and material procurement (block 3504). During production, component and subassembly manufacturing (block 3506) and system integration (block 3508) of aircraft 3600 may take place. Thereafter, aircraft 3600 may go through certification and delivery (block 3210) to be placed in service (block 3212). While in service, aircraft 3600 may be scheduled for routine maintenance and service (block 3214). Routine maintenance and service may include modification, reconfiguration, refurbishment, etc. of one or more systems of aircraft 3600.

Each of the processes of the service method 3500 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 36, aircraft 3600 produced by the service method 3500 may include airframe 3602 with a plurality of high-level systems 3604 and interior 3606. Examples of high-level systems 3604 include one or more of propulsion system 3608, electrical system 3510, hydraulic system 3512, and environmental system 3514. Any number of other systems may be included. Although an aerospace example is shown, the principles disclosed herein may be applied to other industries, such as the automotive industry. Accordingly, in addition to aircraft 3600, the principles disclosed herein may apply to other vehicles, e.g., land vehicles, marine vehicles, space vehicles, etc.

The disclosed methods 500, 1100, 1800, 1900, 2000, 2400, 2500, 3000, 3100, 3400 for fabrication of layups 600 for composite honeycomb core sandwich structures 2100 and said composite honeycomb core sandwich structures 2100 may be employed during any one or more of the stages of the manufacturing and service method 3500. For example, components or subassemblies corresponding to component and subassembly manufacturing (block 3506) may be fabricated or manufactured in a manner similar to components or subassemblies produced while aircraft 3600 is in service (block 3212). Also, one or more examples of the tooling set(s), system(s), method(s), or any combination thereof may be utilized during production stages (block 3506 and block 3508), for example, by substantially expediting assembly of or reducing the cost of aircraft 3600. Similarly, one or more examples of the tooling set, system or method realizations, or a combination thereof, may be utilized, for example and without limitation, while aircraft 3600 is in service (block 3212) and/or during maintenance and service (block 3214).

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the methods 500, 1100, 1800, 1900, 2000, 2400, 2500, 3000, 3100, 3400 for fabrication of layups 600 for composite honeycomb core sandwich structures 2100 and said composite honeycomb core sandwich structures 2100 have been shown and described, modifications may occur to those skilled in the art upon reading the specification. The present application includes such modifications and is limited only by the scope of the claims.

What is claimed is:

1. A method for fabrication of a layup for a composite honeycomb core sandwich structure, the method comprising:
   laying up a first plurality of unidirectional tows over a tool for layup of the composite honeycomb core sandwich structure using an automated fiber placement process to form a stack of under-core composite plies that are tied down to a rough textured surface bonded to the tool;
   placing a honeycomb core on the stack of under-core composite plies within the rough textured surface; and
   laying up a second plurality of unidirectional tows over the honeycomb core using the automated fiber placement process to form a stack of over-core composite plies that tie down the honeycomb core to the rough textured surface.

2. The method of claim 1 wherein the first plurality of unidirectional tows extend beyond a trimline for the composite honeycomb core sandwich structure.

3. The method of claim 1 wherein orientations of the stack of under-core composite plies are quasi-isotropic.

4. The method of claim 1 wherein the rough textured surface is disposed on the tool to frame a trimline for the composite honeycomb core sandwich structure.

5. The method of claim 1 wherein the honeycomb core is placed within a trimline for the composite honeycomb core sandwich structure.

6. The method of claim 1, further comprising:
placing a composite woven fabric sheet over the rough textured surface.

7. The method of claim 6, the placing of the composite woven fabric sheet comprising:
sealing the composite woven fabric sheet on the tool with a compaction bag;
pulling a vacuum on the tool for a predetermined time to compact the composite woven fabric sheet on the rough textured surface;
releasing the vacuum;
unsealing the compaction bag; and
moving the compaction bag off the composite woven fabric sheet.

8. The method of claim 1, further comprising:
placing an under-core film adhesive on the stack of under-core composite plies within a trimline for the composite honeycomb core sandwich structure.

9. The method of claim 8, the placing of the under-core film adhesive comprising:
sealing the under-core film adhesive and the stack of under-core composite plies on the tool with a compaction bag;
pulling a vacuum on the tool for a predetermined time to compact the under-core film adhesive on the stack of under-core composite plies;
releasing the vacuum;
unsealing the compaction bag; and
moving the compaction bag off the under-core film adhesive and the stack of under-core composite plies.

10. The method of claim 1, the placing of the honeycomb core comprising:
locating the honeycomb core within a trimline for the composite honeycomb core sandwich structure;
sealing the honeycomb core and the stack of under-core composite plies on the tool with a compaction bag;
pulling a vacuum on the tool for a predetermined time to compact the honeycomb core on the stack of under-core composite plies;
releasing the vacuum;
unsealing the compaction bag; and
moving the compaction bag off the honeycomb core and the stack of under-core composite plies.

11. The method of claim 1, further comprising:
placing an over-core film adhesive on the honeycomb core within a trimline for the composite honeycomb core sandwich structure.

12. The method of claim 1 wherein the honeycomb core comprises a three-dimensional body with a top surface, a bottom surface and at least three sides chamfered from the top surface toward the bottom surface, the method further comprising:
analyzing the honeycomb core to determine risks of the at least three sides crushing during autoclave cure of the composite honeycomb core sandwich structure; and
selecting a primary side with a highest risk of crushing from the at least three sides.

13. The method of claim 12, the laying up of the first plurality of unidirectional tows comprising:
laying up a first under-core composite ply of a first group of four under-core composite plies at approximately 45-degree orientation to the primary side of the honeycomb core over the tool such as to minimize overlap of the rough textured surface;
laying up a second under-core composite ply of the first group of four under-core composite plies at approximately 0-degree orientation to the primary side of the honeycomb core over the first under-core composite ply such as to approximately line up with the rough textured surface;
laying up a third under-core composite ply of the first group of four under-core composite plies at approximately −45-degree orientation to the primary side of the honeycomb core over the second under-core composite ply such as to minimize overlap of the rough textured surface; and
laying up a fourth under-core composite ply of the first group of four under-core composite plies at approximately 90-degree orientation to the primary side of the honeycomb core over the third under-core composite ply such as to overlap the rough textured surface.

14. The method of claim 13, the laying up of the first plurality of unidirectional tows further comprising:
laying up a second group of four under-core composite plies prior to the laying up of the first group of four such that the second group of four is under the first group of four, wherein the second group of four is laid up in a similar fashion as the first group of four except the fourth under-core composite ply in the second group of four overlaps the rough textured surface less than the fourth under-core composite ply of the first group of four.

15. The method of claim 12, the laying up of the first plurality of unidirectional tows comprising:
laying up a first under-core composite ply of a first group of two under-core composite plies at approximately 0-degree orientation to the primary side of the honeycomb core over the tool such as to minimize overlap of the rough textured surface; and
laying up a second under-core composite ply of the first group of two under-core composite plies at approximately 90-degree orientation to the primary side of the honeycomb core over the first under-core composite ply such as to overlap the rough textured surface.

16. The method of claim 15, the laying up of the first plurality of unidirectional tows further comprising:
laying up a second group of two under-core composite plies prior to the laying up of the first group of two such that the second group of two is under the first group of two, wherein the second group of two is laid up in a similar fashion as the first group of two except the second under-core composite ply in the second group of two overlaps the rough textured surface less than the second under-core composite ply of the first group of two.

17. The method of claim 12, the laying up of the second plurality of unidirectional tows comprising:
laying up a first over-core composite ply of a first group of four over-core composite plies at approximately 90-degree orientation to the primary side of the honeycomb core over the honeycomb core and the first plurality of unidirectional tows such as to approximately overlap the honeycomb core and at least a first portion of the rough textured surface;

laying up a second over-core composite ply of the first group of four over-core composite plies at approximately −45-degree orientation to the primary side of the honeycomb core over the first over-core composite ply such as to approximately overlap at least a portion of the first over-core composite ply and at least a second portion of the rough textured surface;

laying up a third over-core composite ply of the first group of four over-core composite plies at approximately 0-degree orientation to the primary side of the honeycomb core over the second over-core composite ply such as to approximately overlap the first over-core composite ply and at least a portion of the second over-core composite ply; and laying up a fourth over-core composite ply of the first group of four over-core composite plies at approximately 45-degree orientation to the primary side of the honeycomb core over the third over-core composite ply such as to approximately overlap of the second over-core composite ply and at least a portion of the third over-core composite ply.

18. The method of claim 17, the laying up of the second plurality of unidirectional tows further comprising:

laying up a second group of four over-core composite plies over the first group of four over-core composite plies, the second group of four being laid up in a similar fashion as the first group of four.

19. A method for fabrication of a layup for a composite honeycomb core sandwich structure, the method comprising:

laying up a first plurality of unidirectional tows over a tool for layup of the composite honeycomb core sandwich structure using an automated fiber placement process to form a stack of under-core composite plies that are tied down to a rough textured surface bonded to the tool;

placing an under-core film adhesive on the stack of under-core composite plies within a trimline for the composite honeycomb core sandwich structure;

placing a honeycomb core on the under-core film adhesive within the trimline;

placing an over-core film adhesive on the honeycomb core within the trimline; and laying up a second plurality of unidirectional tows over the over-core film adhesive and the rough textured surface using the automated fiber placement process to form a stack of over-core composite plies that tie down the honeycomb core to the rough textured surface.

20. The method of claim 19, further comprising:

placing a composite woven fabric sheet over the rough textured surface.

* * * * *